United States Patent
Lu

(10) Patent No.: US 10,579,305 B2
(45) Date of Patent: Mar. 3, 2020

(54) METHOD AND APPARATUS FOR PROCESSING READ/WRITE REQUEST IN PHYSICAL MACHINE

(71) Applicant: Huawei Technologies Co., Ltd., Shenzhen (CN)

(72) Inventor: Lina Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/025,584

(22) Filed: Jul. 2, 2018

(65) Prior Publication Data
US 2018/0321879 A1 Nov. 8, 2018

Related U.S. Application Data

(63) Continuation of application No. PCT/CN2016/111503, filed on Dec. 22, 2016.

(30) Foreign Application Priority Data

Dec. 31, 2015 (CN) .......................... 2015 1 1028575
Jul. 1, 2016 (CN) .......................... 2016 1 0519710

(51) Int. Cl.
*G06F 9/455* (2018.01)
*G06F 13/42* (2006.01)
(Continued)

(52) U.S. Cl.
CPC .............. *G06F 3/0659* (2013.01); *G06F 3/06* (2013.01); *G06F 3/061* (2013.01); *G06F 3/0604* (2013.01);
(Continued)

(58) Field of Classification Search
CPC ...... G06F 3/0659; G06F 13/105; G06F 3/061; G06F 13/4282; G06F 3/0679;
(Continued)

(56) References Cited

U.S. PATENT DOCUMENTS 8,930,568 B1 1/2015 Chalmer et al.
2011/0161955 A1 6/2011 Woller et al.
(Continued)

FOREIGN PATENT DOCUMENTS

CN 101430674 A 5/2009
CN 102713847 A 10/2012
(Continued)

OTHER PUBLICATIONS

Anonymous, "Serial ATA Native Command Queuing", Jul. 2013, pp. 1-12, https://www.seagate.com/docs/pdf/whitepaper/D2c_tech_paper_intc-stx_sata_ncq.pdf (Year: 2013).*
(Continued)

*Primary Examiner* — Christopher D Birkhimer
(74) *Attorney, Agent, or Firm* — Conley Rose, P.C.

(57) ABSTRACT

A method and an apparatus for processing a read/write request in a physical machine, where the method includes polling, by a host by accessing memory of at least one of virtual storage devices, at least one instruction transmit queue of the at least one virtual storage device in order to obtain a first read/write request from the at least one instruction transmit queue, performing a first forwarding operation on the first read/write request, and obtaining, by the host, another first read/write request from the at least one instruction transmit queue by polling such that the host performs the first forwarding operation on the other first read/write request. According to the method and the apparatus in embodiments of the present disclosure, a speed of processing a read/write request in a virtualization storage scenario can be increased.

18 Claims, 13 Drawing Sheets

(51) Int. Cl.
*G06F 3/06* (2006.01)
*G06F 13/10* (2006.01)
*G06F 13/16* (2006.01)

(52) U.S. Cl.
CPC .......... *G06F 3/0664* (2013.01); *G06F 3/0679* (2013.01); *G06F 9/45558* (2013.01); *G06F 13/105* (2013.01); *G06F 13/1668* (2013.01); *G06F 13/4282* (2013.01); *G06F 2009/45579* (2013.01); *G06F 2213/0028* (2013.01)

(58) Field of Classification Search
CPC .. G06F 3/0604; G06F 13/1668; G06F 3/0664; G06F 9/45558; G06F 3/06; G06F 2213/0028; G06F 2009/45579
See application file for complete search history.

(56) References Cited

U.S. PATENT DOCUMENTS

| | | |
|---|---|---|
| 2011/0179214 A1 | 7/2011 | Goggin et al. |
| 2013/0055259 A1 | 2/2013 | Dong |
| 2014/0047208 A1 | 2/2014 | Morse |
| 2014/0331223 A1 | 11/2014 | Lee et al. |
| 2018/0018135 A1 | 1/2018 | Shen |

FOREIGN PATENT DOCUMENTS

| | | |
|---|---|---|
| CN | 102754076 A | 10/2012 |
| CN | 103631537 A | 3/2014 |
| CN | 104598170 A | 5/2015 |
| CN | 104636077 A | 5/2015 |
| CN | 106201349 A | 12/2016 |

OTHER PUBLICATIONS

Margaret Rouse, "Queue Depth", Jan. 2012, pp. 1-3, https://searchstorage.techtarget.com/definition/queue-depth (Year: 2012).*
Mariusz, "What is Storage Queue Depth (QD) and why is it so important?", Apr. 3, 2015, pp. 1-6, https://www.settlersoman.com/what-is-storage-queue-depth-qd-and-why-is-it-so-important/ (Year: 2015).*
Anonymous, "Memory-Mapped I/O vs Port-Mapped I/O—2013", Sep. 11, 2013, pp. 1-4, https://web.archive.org/web/20130911212755/https://www.bogotobogo.com/Embedded/memory_mapped_io_vs_port_mapped_isolated_io.php (Year: 2013).*
Machine Translation and Abstract of Chinese Publication No. CN101430674, May 13, 2009, 16 pages.
Machine Translation and Abstract of Chinese Publication No. CN103631537, Mar. 12, 2014, 32 pages.
Jong, R., et al, "I/O Stack Design and Prototype System Implementation of PCIe SSD," Journal of Computer Research and Development, Dec. 15, 2015, 7 pages.
Foreign Communication From A Counterpart Application, Chinese Application No. 2016105197104, Chinese Search Report dated Aug. 6, 2018, 2 pages.
Foreign Communication From A Counterpart Application, Chinese Application No. 2016105197104, Chinese Office fiction dated Oct. 12, 2018, 4 pages.
Machine Translation and Abstract of Chinese Publication No. CN104636077, May 20, 2015, 17 pages.
Machine Translation and Abstract of Chinese Publication No. CN106201349, Dec. 7, 2016, 74 pages.
Campbell, S., "Navigating Storage in a Cloudy Environment," HGST, 2013, 45 pages.
Swanson, S., et al.,"Refactor, Reduce, Recycle: Restructuring the I/O Stack for the Future of Storage," Published by the IEEE Computer Society, Aug. 2013, 8 pages.
"SSDs to Account for One-Third of Worldwide PC Storage Shipments by 2017," Retrieved from internet: https://technology.ihs.com/433958/ssds-to-account-for-one-third-of-worldwide-pc-storage-shipments-by-2017, May 2, 2013, 2 pages.
Oikawa, S., "Virtualizing Storage as Memory for High Performance Storage Access," IEEE International Symposium on Parallel and Distributed Processing with Applications, 2014, pp. 18-25.
Foreign Communication From A Counterpart Application, PCT Application No. PCT/CN2016/111503, English Translation of International Search Report dated Apr. 12, 2017, 2 pages.
Foreign Communication From A Counterpart Application, PCT Application No. PCT/CN2016/111503, English Translation of Written Opinion dated Apr. 12, 2017, 8 pages.
Foreign Communication From A Counterpart Application, European Application No. 16881072.9, Extended European Search Report dated Nov. 22, 2018, 7 pages.

* cited by examiner

METHOD AND APPARATUS FOR PROCESSING READ/WRITE REQUEST IN PHYSICAL MACHINE

CROSS-REFERENCE TO RELATED APPLICATIONS

This application is a continuation of International Patent Application No. PCT/CN2016/111503 filed on Dec. 22, 2016 which claims priority to Chinese Patent Application No. 201511028575.5 filed on Dec. 31, 2015, and Chinese Patent Application No. 201610519710.4 filed on Jul. 1, 2016. All of the aforementioned patent applications are hereby incorporated by reference in their entireties.

TECHNICAL FIELD

The present disclosure relates to the computer field, and in particular, to a method and an apparatus for processing a read/write request in a physical machine, and a virtualization method and apparatus.

BACKGROUND

Virtualization includes computation virtualization, network virtualization, and storage virtualization. The storage virtualization is used to provide a storage service to a virtual machine. Performance of the storage service mainly depends on an access speed to a storage medium and overheads of a storage software stack. With development of storage hardware in recent years, a high-speed storage medium such as a solid-state drive (SSD), a non-volatile memory (NVM) express (NVMe), or a flash gradually appears. The access speed to the storage medium is accelerated to an ns level from an ms level of a mechanical disk. As a result, a great challenge is brought to the storage software stack.

A conventional storage software stack provides a storage service to a user mode application program in an interrupt return manner and using a system call entry. A storage software stack of a conventional physical machine includes a file system, a generic block layer, an input/output (I/O) scheduling layer, a small computer system interface (SCSI) layer, and the like. The file system provides a convenient storage management interface to a user. The generic block layer provides a universal I/O processing manner, including a synchronization processing method, an asynchronization processing method, an interrupt processing method, or the like to various physical storage mediums. The I/O scheduling layer sorts and combines I/O instructions, optimizes a mechanical disk addressing time at the cost of software computation, and develops a related scheduling function such as quality of service (QoS) later. The SCSI layer is classified into three layers, an SCSI upper layer, an SCSI middle layer, and an SCSI lower layer. A SCSI protocol or a unified interface is provided such that a physical machine can conveniently use different types of storage hardware.

However, in a virtualization scenario, there may be a virtualized storage software stack in addition to a storage software stack of an operating system (OS). The virtualized storage software stack mainly includes a front-end driver, a back-end storage service process, and a virtual machine monitor (VMM). The front-end driver interacts with the back-end storage service process using a virtualization technology in order to transmit an I/O request. The VMM provides a basic capability such as memory management, interrupt injection, enter and exit, or notification wake-up. A kernel-based virtual machine (KVM) is used as an example.

A storage I/O procedure in virtualization is shown in FIG. 2. For an I/O request, first, the I/O request is delivered from an application in the virtual machine to a kernel of the virtual machine using a system call, then passes through a storage software stack of the virtual machine, and finally is put in a device queue (for example, an I/O ring of virtio) of a virtual disk. Afterward, virtual machine exit is triggered by writing a specific port, and a hypervisor layer (for example, a KVM module in FIG. 2) intercepts the request. Finally, by waking up QEMU, the request is sent to a QEMU process for processing. After the QEMU is woken up, the request is delivered to a storage software stack on a host side using a system call again, and is finally sent to a device queue of a physical storage device after being processed by the storage software stack on the host side. By writing in a register, the physical storage device is instructed to process the I/O request. After completing processing, the physical storage device notifies a software stack on the host side of an I/O completion event in an interrupt injection manner, and finally wakes up asynchronous I/O (aI/O) of user mode QEMU to perform handle listening. The QEMU makes a result obtained after processing pass through a completion queue (for example, the I/O ring of the virtio) of a virtual storage device again. An interrupt is injected into the virtual machine using the KVM. Finally, a virtual machine OS processes the interrupt, and finally returns the interrupt to a user mode application.

It can be learned from the above that in a storage virtualization scenario, a processing process of a storage software stack is relatively complex. As a result, read/write request processing is time-consuming, and storage performance is affected. In particular, as the access speed to the storage medium continuously increases and the overheads of the storage software stack are increasingly apparent, a percentage of a delay of the storage software stack to an entire I/O delay is 19.3% in an SSD, and a percentage of overheads of the storage software stack in a higher-speed double data rate (DDR) NVM medium has reached 94.1%. As a result, the access speed to the storage medium is seriously affected, and the storage software stack becomes a bottleneck for storage performance improvement.

SUMMARY

The present disclosure provides a method and an apparatus for processing a read/write request in a physical machine in order to increase a read/write request processing speed in a virtualization storage scenario, and reduce an I/O delay.

According to a first aspect, an embodiment of the present disclosure provides a method for processing a read/write request in a physical machine, where the physical machine includes a physical storage device, a host machine (also referred to as host), and a virtual machine, the physical machine provides, based on a virtual storage device virtualized by the physical storage device, a storage service to the virtual machine, and the method includes polling, by the host by accessing virtual memory space corresponding to at least one of virtual storage devices, at least one instruction transmit queue of the at least one virtual storage device in order to obtain multiple first read/write requests from the at least one instruction transmit queue, where the virtual memory space is simulated by the host in a memory mapped I/O (MMIO) manner, the first read/write requests are from an application that runs on the virtual machine, and each first read/write request includes information about a target virtual storage device, and performing, by the host, a first forwarding operation on each of the multiple first read/write requests, where the first forwarding operation includes generating, by the host according to the information about the target virtual storage device included in the first read/write request and a mapping relationship between the information about the target virtual storage device and information about a target physical storage device, a second read/write request corresponding to the first read/write request, where the second read/write request includes the information about the target physical storage device, and adding, by the host, the second read/write request to an instruction transmit queue of the target physical storage device according to the information about the target physical storage device such that the target physical storage device obtains the second read/write request from the instruction transmit queue, and performs a read/write operation according to the second read/write request.

In this way, a host can actively poll an instruction transmit queue of a virtual storage device to obtain a first read/write request delivered by an application, and forward the first read/write request after processing to an instruction transmit queue of a target physical storage device. The other approaches in which a QEMU process of a host is woken up by means of virtual machine exit, to process a read/write request using a software stack is avoided. Virtual machine exit and enter are not needed in the polling process. Further, virtual memory space corresponding to the virtual storage device is accessed by means of MMIO such that the virtual machine exit is avoided. The QEMU process is replaced with a read/write request processing process, and a read/write request is obtained in the process in a polling manner, thereby simplifying a process of processing a read/write request by the host, increasing a speed of processing a read/write request by software, and reducing a delay of processing the read/write request by the software.

With reference to the first aspect, in a first implementation of the first aspect, the generating, by the host according to the information about the target virtual storage device included in the first read/write request and a mapping relationship between the information about the target virtual storage device and information about a target physical storage device, a second read/write request corresponding to the first read/write request includes determining, by the host, the information about the target physical storage device according to the information about the target virtual storage device included in the first read/write request and the mapping relationship between the information about the target virtual storage device and the information about the target physical storage device, and generating, by the host, the second read/write request corresponding to the first read/write request, where the second read/write request includes the information about the target physical storage device, and a format of the second read/write request matches the target physical storage device.

It should be noted that, that the format of the second read/write request matches the target physical storage device indicates that the format of the second read/write request is the same as a type of the corresponding target physical storage device. That is, a storage protocol followed by the second read/write request is the same as a storage protocol used by the target physical storage device.

Further, generating, by the host according to the information about the target virtual storage device included in the first read/write request and a mapping relationship between the information about the target virtual storage device and information about a target physical storage device, a second read/write request corresponding to the first read/write request may include parsing, by the host, the first read/write request to obtain read/write request content in a unified format, where the read/write request content in the unified format includes the information about the target virtual storage device, changing, according to the mapping relationship between the information about the target virtual storage device and the information about the target physical storage device, the read/write request content in the unified format into the information about the target physical storage device, and encapsulating, using a storage protocol corresponding to the target physical storage device, read/write request content obtained after changing in order to obtain the second read/write request.

Further, storage protocols are used in the foregoing parsing and encapsulation. Different storage protocols may be used in a parsing process and an encapsulation process. An encapsulation protocol used in the parsing process is determined according to the information about the target virtual storage device, and an encapsulation protocol used in the encapsulation process is determined according to the information about the target physical storage device.

Therefore, the host can centrally analyze read/write request content, and can perform centralized processing regardless of storage protocols followed by the first read/write request and the second read/write request. In addition, the read/write request processing process can conveniently obtain first read/write requests of virtual storage devices of different storage protocols for processing, without the need to distinguish the storage protocols of the different virtual storage devices.

With reference to the first aspect or the first implementation of the first aspect, in a second implementation of the first aspect, the method further includes obtaining, by the host, a third read/write request from the at least one instruction transmit queue by means of polling, where the third read/write request includes a length of read/written data and information about a read/written virtual storage device, the read/written virtual storage device includes a read/written target virtual block device, and the length of the to-be-read/written data is greater than or equal to a readable/writable address range of the read/written target virtual block device, generating, by the host, a response to the third read/write request, and adding, by the host, the response to the third read/write request to an instruction response queue of the read/written virtual storage device, where the response to the third read/write request indicates that a read/write operation corresponding to the third read/write request fails.

Therefore, when the length of the to-be-read/written data is greater than or equal to the readable/writable address range of the read/written target virtual block device, the host generates a response and adds the response to a response queue of the target virtual storage device. Therefore, read/write request validity can be checked, a read/write request that exceeds the range can be filtered, a read/write request whose read/write operation cannot be performed is intercepted without the need to refer to the second read/write request and the target physical storage device, resources are saved, and a response speed of the read/write request that exceeds the range is also accelerated.

With reference to the first aspect or the first implementation of the first aspect, in a third implementation of the first aspect, the method further includes polling, by the host, at least one instruction response queue of at least one of physical storage devices in order to obtain multiple second read/write responses from the at least one instruction response queue, where an interrupt of the at least one instruction response queue is a disabled state or a processor of the physical machine is configured for ignoring an interrupt request of the at least one instruction response queue, the second read/write responses indicate that a target physical storage device has performed a read/write operation, and the second read/write responses include the information about the target physical storage device, and performing, by the host, a second forwarding operation on each of the multiple second read/write responses, where the second forwarding operation includes generating, by the host according to the information about the target physical storage device and the mapping relationship between the information about the target physical storage device and the information about the target virtual storage device, a first read/write response corresponding to the second read/write response, where the first read/write response includes the information about the target virtual storage device, and adding, by the host, the first read/write response to an instruction response queue of the target virtual storage device according to the information about the target virtual storage device such that the application obtains the first read/write response.

In this way, a host adds a first read/write response to a first read/write request to an instruction response queue of a target virtual storage device to form a complete processing process of returning a response according to a request. A second read/write response is obtained from an instruction response queue of a physical storage device also in a polling manner. The process corresponds to the description of the first aspect. For an effect of this process, refer to an effect description of the first aspect.

With reference to the third implementation of the first aspect, in a fourth implementation of the first aspect, the generating, by the host according to the information about the target physical storage device and the mapping relationship between the information about the target physical storage device and the information about the target virtual storage device, a first read/write response corresponding to the second read/write response includes determining, by the host, the information about the target virtual storage device according to the information about the target physical storage device and the mapping relationship between the information about the target physical storage device and the information about the target virtual storage device, and generating, by the host, the first read/write response corresponding to the second read/write response, where the first read/write response includes the information about the target virtual storage device, and a format of the first read/write response matches the target virtual storage device.

The fourth implementation of the first aspect corresponds to the first implementation of the first aspect in terms of technical means. For a specific description and a specific effect of the fourth implementation of the first aspect, refer to an effect description of the first implementation of the first aspect.

Based on the foregoing technical solutions, an instruction transmit queue of a virtual storage device is polled using a process, thereby simplifying a process of processing a read/write request by a host, increasing a speed of processing a read/write request by software, and reducing a delay of processing the read/write request by the software.

According to a second aspect, an embodiment of the present disclosure provides a read/write request processing apparatus, where the apparatus runs on a physical machine, the physical machine includes a physical storage device, a host machine, and a virtual machine, the physical machine provides, based on a virtual storage device virtualized by the physical storage device, a storage service to the virtual machine, and the apparatus includes a request obtaining module configured to poll, by accessing virtual memory space corresponding to at least one of virtual storage devices, at least one instruction transmit queue of the at least one virtual storage device in order to obtain multiple first read/write requests from the at least one instruction transmit queue, where the virtual memory space is simulated by the host in an MMIO manner, the first read/write requests are from an application that runs on the virtual machine, and each first read/write request includes information about a target virtual storage device, and a request forwarding module configured to perform a first forwarding operation on each of the multiple first read/write requests, where the first forwarding operation includes generating, according to the information about the target virtual storage device and a mapping relationship between the information about the target virtual storage device and information about a target physical storage device, a second read/write request corresponding to the first read/write request, where the second read/write request includes the information about the target physical storage device, and adding the second read/write request to an instruction transmit queue of the target physical storage device according to the information about the target physical storage device such that the target physical storage device obtains the second read/write request from the instruction transmit queue, and performs a read/write operation according to the second read/write request.

In this way, the apparatus can actively poll an instruction transmit queue of a virtual storage device to obtain a first read/write request delivered by an application, and forward the first read/write request after processing to an instruction transmit queue of a target physical storage device. The other approaches in which a QEMU process of a host is woken up by means of virtual machine exit, to process a read/write request using a software stack is avoided. Virtual machine exit and enter are not needed in the polling process. Further, virtual memory space corresponding to the virtual storage device is accessed by means of MMIO such that the virtual machine exit is avoided. The QEMU process is replaced with an independent process, and a read/write request is obtained in the process in a polling manner, thereby simplifying a process of processing a read/write request by the host, increasing a speed of processing a read/write request by software, and reducing a delay of processing the read/write request by the software.

The second aspect is an apparatus corresponding to the method according to the first aspect. For various implementations and technical effects of the second aspect, refer to various implementations of the first aspect.

According to a third aspect, an embodiment of the present disclosure provides a physical machine, where the physical machine includes a physical storage device, a host machine, and a virtual machine, the physical machine provides, based on a virtual storage device virtualized by the physical storage device, a storage service to the virtual machine, and the host is configured to perform the method according to any one of the first aspect or the implementations of the first aspect.

According to a fourth aspect, an embodiment of the present disclosure provides a method for processing a read/write response in a physical machine, where the physical machine includes a physical storage device, a host machine, and a virtual machine, the physical machine provides, based on a virtual storage device virtualized by the physical storage device, a storage service to the virtual machine, and the method includes polling, by the host, at least one instruction response queue of at least one of physical storage devices in order to obtain multiple first read/write responses from the at least one instruction response queue, where an interrupt of the at least one instruction response queue is a disabled state or a processor of the physical machine is configured for ignoring an interrupt request of the at least one instruction response queue, the first read/write responses indicate that a target physical storage device has performed a read/write operation, and the first read/write responses include information about the target physical storage device, and performing, by the host, a forwarding operation on each of the multiple first read/write responses, where the forwarding operation includes generating, by the host according to the information about the target physical storage device and a mapping relationship between the information about the target physical storage device and information about a target virtual storage device, a second read/write response corresponding to the first read/write response, where the second read/write response includes the information about the target virtual storage device, and adding, by the host, the second read/write response to an instruction response queue of the target virtual storage device according to the information about the target virtual storage device such that an application obtains the second read/write response.

In this way, a host can actively poll an instruction response queue of a physical storage device to obtain a first read/write response delivered by an application, and forward the first read/write response after processing to an instruction response queue of a target virtual storage device. The other approaches in which a host is instructed, using an interrupt of a physical storage device, to process a read/write response is avoided. Further, an interrupt of at least one instruction response queue is a disabled state or a processor of a physical machine is configured for ignoring an interrupt request of the at least one instruction response queue. A QEMU process is replaced with a read/write response processing process, and a read/write response is obtained in the process in a polling manner, thereby simplifying a process of processing a read/write response by the host, increasing a speed of processing a read/write response by software, and reducing a delay of processing the read/write response by the software.

With reference to the fourth aspect, in a first implementation of the fourth aspect, the method includes determining, by the host, the information about the target virtual storage device according to the information about the target physical storage device and the mapping relationship between the information about the target physical storage device and the information about the target virtual storage device, and generating, by the host, the second read/write response corresponding to the first read/write response, where the second read/write response includes the information about the target virtual storage device, and a format of the second read/write response matches the target virtual storage device.

Because this implementation is similar to the first implementation of the first aspect, for a description of this implementation and illustration of a technical effect, refer to the first implementation of the first aspect.

According to a fifth aspect, an embodiment of the present disclosure provides a read/write response processing apparatus, where the apparatus runs on a physical machine, the physical machine includes a physical storage device, a host machine, and a virtual machine, the physical machine provides, based on a virtual storage device virtualized by the physical storage device, a storage service to the virtual machine, and the apparatus includes a response obtaining module configured to poll at least one instruction response queue of at least one of physical storage devices in order to obtain multiple first read/write responses from the at least one instruction response queue, where an interrupt of the at least one instruction response queue is a disabled state or a processor of the physical machine is configured for ignoring an interrupt request of the at least one instruction response queue, the first read/write responses indicate that a target physical storage device has performed a read/write operation, and the first read/write responses include information about the target physical storage device, and a response forwarding module configured to perform a forwarding operation on each of the multiple first read/write responses, where the forwarding operation includes generating, according to the information about the target physical storage device and a mapping relationship between the information about the target physical storage device and information about a target virtual storage device, a second read/write response corresponding to the first read/write response, where the second read/write response includes the information about the target virtual storage device, and adding the second read/write response to an instruction response queue of the target virtual storage device according to the information about the target virtual storage device such that an application obtains the second read/write response.

The fifth aspect is an apparatus corresponding to the method according to the fourth aspect. For various implementations and technical effects of the fifth aspect, refer to various implementations of the fourth aspect.

According to a sixth aspect, an embodiment of the present disclosure provides a method for processing a read/write request in a physical machine, where the physical machine includes a physical storage device, a host machine, and a virtual machine, the physical machine provides, based on a virtual storage device virtualized by the physical storage device, a storage service to the virtual machine, at least one of physical storage devices virtualizes the virtual storage device in a one-to-one correspondence manner, information about each virtual storage device is the same as information about a physical storage device corresponding to the virtual storage device, and the method includes polling, by the host by accessing virtual memory space corresponding to at least one of virtual storage devices, at least one instruction transmit queue of the at least one virtual storage device in order to obtain multiple read/write requests from the at least one instruction transmit queue, where the virtual memory space is simulated by the host in an MMIO manner, the read/write requests are from an application that runs on the virtual machine, and the read/write requests include information about a target physical storage device, and performing, by the host, a first forwarding operation on each of the multiple read/write requests, where the first forwarding operation includes adding, by the host, the read/write request to an instruction transmit queue of the target physical storage device according to the information about the target physical storage device such that the target physical storage device obtains the read/write request from the instruction transmit queue, and performs a read/write operation according to the read/write request.

The sixth aspect is a method corresponding to the first aspect, and is applied to another scenario, that is, at least one of physical storage devices virtualizes the virtual storage device in a one-to-one correspondence manner, and information about each virtual storage device is the same as information about a physical storage device corresponding to the virtual storage device. In this case, the host directly forwards the foregoing read/write request. For a technical effect of the sixth aspect, refer to the first aspect.

With reference to the sixth aspect, in a first implementation of the sixth aspect, the method further includes a corresponding process of returning a read/write response. In this case, the host directly forwards a read/write response. For the process, refer to a seventh aspect.

According to a seventh aspect, an embodiment of the present disclosure provides a method for processing a read/write response in a physical machine, where the physical machine includes a physical storage device, a host machine, and a virtual machine, the physical machine provides, based on a virtual storage device virtualized by the physical storage device, a storage service to the virtual machine, at least one of physical storage devices virtualizes the virtual storage device in a one-to-one correspondence manner, information about each virtual storage device is the same as information about a physical storage device corresponding to the virtual storage device, and the method includes polling, by the host, at least one instruction response queue of the at least one physical storage device in order to obtain multiple read/write responses from the at least one instruction response queue, where an interrupt of the at least one instruction response queue is a disabled state or a processor of the physical machine is configured for ignoring an interrupt request of the at least one instruction response queue, the read/write responses indicate that a target physical storage device has performed a read/write operation, and the read/write responses include information about the target physical storage device, and performing, by the host, a second forwarding operation on each of the multiple read/write responses, where the second forwarding operation includes adding, by the host, the read/write response to an instruction response queue of a target virtual storage device according to the information about the target physical storage device such that the application obtains the read/write response.

The seventh aspect is a method corresponding to the fourth aspect, and is applied to another scenario, that is, at least one of physical storage devices virtualizes the virtual storage device in a one-to-one correspondence manner, and information about each virtual storage device is the same as information about a physical storage device corresponding to the virtual storage device. In this case, the host directly forwards the foregoing read/write response. For a technical effect of the seventh aspect, refer to the fourth aspect.

According to an eighth aspect, an embodiment of the present disclosure provides a read/write request processing apparatus, and a read/write response processing apparatus. For various implementations and technical effects of the read/write request processing apparatus, refer to various implementations of the sixth aspect. For various implementations and technical effects of the read/write response processing apparatus, refer to various implementations of the seventh aspect.

According to a ninth aspect, an embodiment of the present disclosure provides a physical machine, where the physical machine includes a physical storage device, a host machine, and a virtual machine, the physical machine provides, based on a virtual storage device virtualized by the physical storage device, a storage service to the virtual machine, and the host is configured to perform at least one of the methods according to the sixth aspect, the first implementation of the sixth aspect, and the seventh aspect.

According to a tenth aspect, an embodiment of the present disclosure provides a storage medium, where the storage medium is used to store the method according to any one of the first aspect or the implementations of the first aspect. In addition, this embodiment of the present disclosure provides an application program, where the application program is used to perform the method according to any one of the first aspect or the implementations of the first aspect.

According to an eleventh aspect, an embodiment of the present disclosure provides a storage medium, where the storage medium is used to store the method according to any one of the fourth aspect or the implementations of the fourth aspect. In addition, this embodiment of the present disclosure provides an application program, where the application program is used to perform the method according to any one of the fourth aspect or the implementations of the fourth aspect.

According to a twelfth aspect, an embodiment of the present disclosure provides a storage medium, where the storage medium is used to store at least one of the methods according to the sixth aspect, the first implementation of the sixth aspect, and the seventh aspect. In addition, this embodiment of the present disclosure provides an application program, where the application program is used to perform at least one of the methods according to the sixth aspect, the first implementation of the sixth aspect, and the seventh aspect.

In the foregoing aspects, a read/write request indicates a read request or a write request. A first read/write request to a fourth read/write request each indicate a read request or each indicate a write request. A read/write response indicates a read response to a read request or a write response to a write request. A first read/write response to a fourth read/write response each indicate a read response to a read request, or each indicate a write response to a response request.

In the foregoing aspects, the information about the target virtual storage device includes an identifier (ID) and an address of the target virtual storage device, and the information about the target physical storage device includes an ID and an address of the target physical storage device.

The host stores a mapping relationship between information about a virtual storage device and information about a physical storage device, and the mapping relationship may be a mapping table. The information about the virtual storage device includes an ID and an address of the virtual storage device, and the information about the physical storage device includes an ID and an address of the physical storage device.

In the foregoing aspects, the virtual memory space corresponding to the virtual storage device is virtual memory space that is simulated by the host and that is allocated to the virtual storage device for use. The virtual memory space serves the virtual machine. Partial information of the instruction transmit queue and the instruction response queue of the virtual storage device is stored in the virtual memory space. The host reads a request or a response in the instruction transmit queue and the instruction response queue by accessing the information, such as an index that is used to record an instruction quantity in a queue.

In the foregoing aspects, the host may disable an interrupt of a central processing unit (CPU) of the virtual machine using a virtual machine control structure (VMCS) such that the CPU continuously delivers multiple read/write requests to the at least one instruction transmit queue.

"Continuously" indicates a process in which delivering the multiple read/write requests by the CPU is not interrupted by other tasks. In this way, relatively high efficiency of delivering a read/write request can be ensured, and interrupt interference is avoided.

In the foregoing aspects of the described method, the method is completed by the host using a read/write request processing process. The read/write request processing process is used to perform at least one of the following operations of processing a read/write request delivered by a virtual machine, or returning a response to a virtual machine after a physical storage device performs a read/write operation. Further, the foregoing method may be used in multiple read/write request processing processes in the host, for example, in a case of a relatively large quantity of read/write requests. Further, when a QEMU process is replaced with an independent read/write request processing process to process multiple virtual storage devices, lock contention between threads in the QEMU process in an original method can also be avoided.

In the foregoing aspects of the described method, the host continuously performs at least one of the following operations by means of polling, obtaining multiple read/write requests from an instruction transmit queue, or obtaining multiple read/write responses from an instruction response queue. Further, there may be two manners of obtaining a request and/or response (and/or indicates "and" or "or") by means of polling, and processing multiple obtained requests and/or responses. One request or response is obtained in a polling manner and is processed, and then a next request or response is obtained after processing, and so on. Alternatively, multiple requests or responses are obtained in a polling manner and are then processed. For one read/write request processing process, read/write requests can be processed one by one. For multiple read/write request processing processes, multiple read/write requests can be processed in parallel.

In the foregoing aspects of the described method, one or more processes may be used for polling. In a case of multiple processes, multiple read/write requests or responses can be processed in parallel in order to resolve a contention problem of shared resources, such as lock resources in an I/O software stack.

In the foregoing aspects, the host scans an ID of the physical storage device using a peripheral component interconnect (PCI) bus, and loads, when the ID of the physical storage device is stored in a list of a PCI driver, the physical storage device to the host using a loading function of the PCI driver. In this way, physical storage devices that follow various storage protocols can be managed by a same driver in order to avoid a problem that a read/write request or a read/write response that needs to be processed cannot be obtained by means of process polling because the physical storage devices of different storage protocols use different drivers.

In the foregoing aspects, one or more virtual machines may be deployed in the physical machine. The physical machine may include one or more physical storage devices. One virtual machine may call one or more virtual storage devices, and one physical storage device may virtualize one or more virtual storage devices.

In addition, the embodiments of the present disclosure provide a virtualization method in order to resolve a problem that a speed at which an application program in a virtual machine accesses a virtual NVMe device is affected because a QEMU process simulates the virtual NVMe device using a conventional I/O procedure.

According to a thirteenth aspect, an embodiment of the present disclosure provides a virtualization method, where the method is performed by a physical machine host. The host includes a virtual machine and a forwarding process of a data plane. The forwarding process of the data plane includes a virtual NVMe driver. The virtual machine includes a virtual NVMe device. The method includes polling, by the forwarding process, a doorbell area of the virtual NVMe device, calling, by the forwarding process, the virtual NVMe driver when the doorbell area changes, and obtaining, from a transmit queue that changes in the doorbell area, an NVMe command delivered by the virtual machine, where the NVMe command includes a read/write request, calling, by the forwarding process, the virtual NVMe driver to parse the NVMe command to obtain a common read/write request, obtaining, by the forwarding process, a result of processing the common read/write request by a physical storage device, calling, by the forwarding process, the virtual NVMe driver to encapsulate the result of the processing by the physical storage device as an NVMe response, and calling, by the forwarding process, the virtual NVMe driver to add the NVMe response to a completion queue corresponding to the transmit queue.

Therefore, according to the virtualization method in this embodiment of the present disclosure, an independent forwarding process completes a read/write operation of a virtual NVMe device, and the forwarding process replaces an original timer manner with a polling manner such that QEMU lock contention can be avoided, and a long delay problem can be resolved, thereby implementing high-performance and low-delay NVMe virtualization, and increasing a speed at which an application program in a virtual machine accesses the virtual NVMe device.

With reference to the thirteenth aspect, in a first possible implementation of the thirteenth aspect, the host further includes a KVM module. After the forwarding process calls the virtual NVMe driver to add the NVMe response to the completion queue corresponding to the transmit queue, the forwarding process calls the virtual NVMe driver to send an interrupt request to the KVM module using eventfd. The KVM module injects an interrupt to the virtual machine according to the interrupt request. The virtual machine obtains the NVMe response from the completion queue.

With reference to the thirteenth aspect or the first possible implementation of the thirteenth aspect, in a second possible implementation of the thirteenth aspect, the host further includes a QEMU process. The QEMU process includes an adaptation driver. Before the forwarding process polls the doorbell area of the virtual NVMe device, the forwarding process calls the virtual NVMe driver to create the virtual NVMe device according to a user request. The forwarding process calls the virtual NVMe driver to allocate memory space shared by the QEMU process and the forwarding process, where the shared memory space includes the doorbell area. The QEMU process calls the adaptation driver to map the shared memory space to a first section of base address register (BAR) space of the virtual NVMe device. The QEMU process calls the adaptation driver to map message signaled interrupt X (MSIX) table space to a second section of the BAR space of the virtual NVMe device. The QEMU process calls the adaptation driver to register a callback function.

Therefore, according to the virtualization method in this embodiment of the present disclosure, before an independent forwarding process completes a read/write operation of a virtual NVMe device, a QEMU process calls an adaptation driver, the forwarding process calls a virtual NVMe driver, and the QEMU process and the forwarding process jointly create the virtual NVMe device such that a subsequent read/write operation has relatively high storage performance.

With reference to the second possible implementation of the thirteenth aspect, in a third possible implementation of the ninth aspect, before the forwarding process calls the virtual NVMe driver to allocate the memory space shared by the QEMU process and the forwarding process, the forwarding process calls the virtual NVMe driver to create namespace of the virtual NVMe device according to a user request. The forwarding process calls the virtual NVMe driver to initialize namespace information of the virtual NVMe device such that the virtual machine reads the namespace information of the virtual NVMe device. The forwarding process calls the virtual NVMe driver to mount a name of the virtual NVMe device to the virtual machine using the name of the virtual NVMe device as a parameter configuration according to a user request.

With reference to the second or the third possible implementation of the thirteenth aspect, in a fourth possible implementation of the ninth aspect, after the QEMU process calls the adaptation driver to register the callback function, the forwarding process polls the doorbell area of the virtual NVMe device. When a command queue 0 of the doorbell area includes a request for creating a completion queue, the forwarding process calls the virtual NVMe driver to obtain, from the command queue 0, the NVMe command delivered by the virtual machine. The forwarding process calls the virtual NVMe driver to parse the NVMe command. The forwarding process calls the virtual NVMe driver to obtain, by parsing the NVMe command, parameters for creating the completion queue, where the parameters include an interrupt number in an MSIX table corresponding to the completion queue, a direct memory access (DMA) address of the completion queue, a completion queue ID, and a completion queue depth. The forwarding process calls the virtual NVMe driver to create the completion queue according to the parameters.

With reference to the fourth possible implementation of the thirteenth aspect, in a fifth possible implementation of the ninth aspect, after the completion queue is created according to the parameters, when the virtual machine accesses the MSIX table space, the QEMU process calls the adaptation driver to create the eventfd using a callback function. The QEMU process calls the adaptation driver to establish, for the KVM module, a correspondence between the eventfd and the interrupt number in the MSIX table in the virtual machine. The QEMU process calls the adaptation driver to send the eventfd and the interrupt number to the forwarding process such that the forwarding process calls the virtual NVMe driver to establish a correspondence between the completion queue and the eventfd.

Therefore, the QEMU process establishes a connection between the completion queue and an interrupt such that the forwarding process calls the virtual NVMe driver to establish the correspondence between the completion queue and the eventfd.

With reference to the fifth possible implementation of the thirteenth aspect, in a sixth possible implementation of the ninth aspect, after the eventfd and the interrupt number are sent to the forwarding process, when the virtual machine intercepts an unmask change or a mask change of the MSIX table, the QEMU calls the adaptation driver and the callback function to send the eventfd and mask, or the eventfd and unmask to the forwarding process. The QEMU calls the adaptation driver to configure, according to the mask or the unmask, an ID indicating whether the virtual NVMe device is pending such that the forwarding process determines, according to the ID, whether to enable the eventfd for the KVM module.

With reference to the sixth possible implementation of the thirteenth aspect, in a seventh possible implementation of the ninth aspect, after the QEMU configures, according to the mask or the unmask, the ID indicating whether the virtual NVMe device is pending, the forwarding process polls the doorbell area of the virtual NVMe device. When the command queue 0 of the doorbell area includes a request for creating a transmit queue, the forwarding process calls the virtual NVMe driver to obtain, from the command queue, the NVMe command delivered by the virtual machine. The forwarding process calls the virtual NVMe driver to parse the NVMe command. The forwarding process calls the virtual NVMe driver to obtain, by parsing the NVMe command, parameters for creating a transmit queue, where the parameters include a transmit queue DMA address, a transmit queue ID, a transmit queue depth, a completion queue ID, and a transmit queue flag bit. The forwarding process calls the virtual NVMe driver to create the transmit queue according to the parameters.

With reference to the second to the sixth possible implementations of the thirteenth aspect, in a seventh possible implementation of the ninth aspect, the calling, by the QEMU process, the adaptation driver to map the shared memory space to a first section of BAR space of the virtual NVMe device includes calling, by the QEMU process, the adaptation driver to map the shared memory space to the first section of the BAR space of the virtual NVMe device in an MMIO manner, calling, by the QEMU process, the adaptation driver to configure a VMCS register in order to prevent enter and exit from being generated in an access process.

Based on the foregoing technical solutions, a read/write operation of a virtual NVMe device is completed using an independent forwarding process, and the forwarding process replaces an original timer manner with a polling manner such that QEMU lock contention can be avoided, and a long delay problem can be resolved, thereby implementing a high-performance and low-delay NVMe virtualization method, and increasing a speed at which an application program in a virtual machine accesses the virtual NVMe device.

According to a fourteenth aspect, an embodiment of the present disclosure provides a virtualization apparatus. The apparatus includes a virtual machine and a forwarding process of a data plane. The forwarding process of the data plane includes a virtual NVMe driver. The virtual machine includes a virtual NVMe device. The forwarding process is used to poll a doorbell area of the virtual NVMe device, call the virtual NVMe driver when the doorbell area changes, obtain, from a transmit queue that changes in the doorbell area, an NVMe command delivered by the virtual machine, where the NVMe command includes a read/write request, call the virtual NVMe driver to parse the NVMe command to obtain a common read/write request, obtain a result of processing the common read/write request by a physical storage device, call the virtual NVMe driver to encapsulate the result of the processing by the physical storage device as an NVMe response, and call the virtual NVMe driver to add the NVMe response to a completion queue corresponding to the transmit queue.

The virtualization apparatus is configured to perform the foregoing method according to any one of the ninth aspect or possible implementations of the ninth aspect.

Therefore, according to the method and apparatus in the embodiments of the present disclosure, a read/write operation of a virtual NVMe device is completed using an independent forwarding process, and the forwarding process replaces an original timer manner with a polling manner such that QEMU lock contention can be avoided, and a long delay problem can be resolved, thereby implementing a high-performance and low-delay NVMe virtualization method, and increasing a speed at which an application program in a virtual machine accesses an NVMe device.

According to a fifteenth aspect, an embodiment of the present disclosure provides a storage medium, where the storage medium is used to store the method according to any one of the ninth aspect or implementations of the ninth aspect.

According to a sixteenth aspect, an embodiment of the present disclosure provides an application program, where the application program is used to perform the method according to any one of the ninth aspect or implementations of the ninth aspect.

BRIEF DESCRIPTION OF DRAWINGS

To describe the technical solutions in embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive another drawing from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that in the embodiments of the present disclosure, sequence numbers of steps do not mean an execution order. The execution order of the steps should be determined according to functions and internal logic of the steps. It should be understood that in the embodiments of the present disclosure, and/or indicates "and" or "or".

It should be understood that a read/write request in the embodiments of the present disclosure indicates a read request or a write request. Therefore, a first read/write request to a third read/write request in the embodiments of the present disclosure each indicate a read request or a write request. A read/write response indicates a read response to a read request or a write response to a write request. A first read/write response to a third read/write response each indicate a read response to a read request or a write response to a response request.

It should be understood that I/O in this specification is I/O, and an I/O instruction refers to a read/write request. It should be noted that read/write in the read/write request in this specification is similar to I/O and indicates read or write. A read/write request processing process in this specification is a process, and such a functional name in this specification is used for an example of differentiation, and is used to express that the process is used to implement the method, instead of limiting the process.

Figure 1:
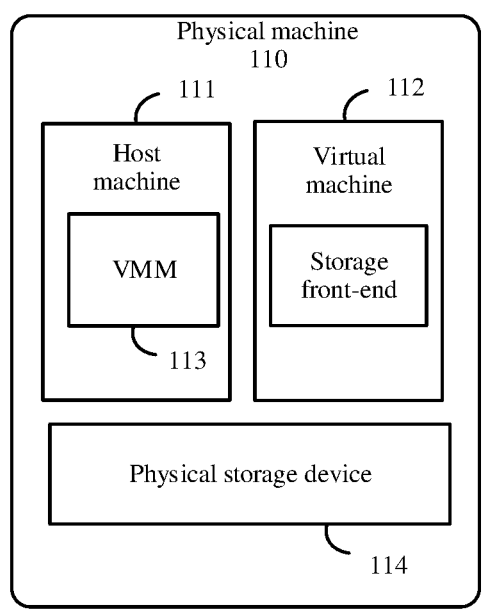
FIG. 1 is a schematic architectural diagram of a physical machine to which a method in an embodiment of the present disclosure is applicable.
Figure 8:
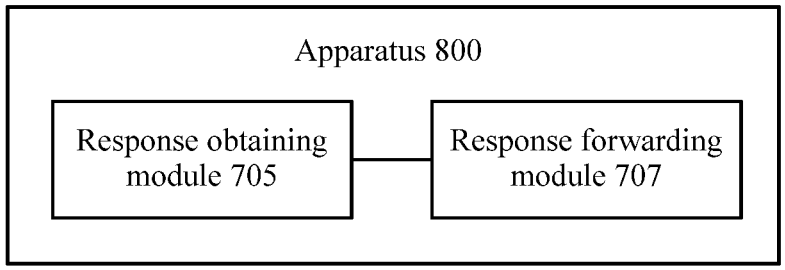
FIG. 8 is a schematic diagram of a read/write response processing apparatus according to an embodiment of the present disclosure.

FIG. 1 shows a schematic diagram of a system architecture of a physical machine to which a read/write request processing method in an embodiment of the present disclosure is applicable. It should be understood that FIG. 1 is only a schematic illustration diagram for ease of understanding, and does not limit a composition mode of the system architecture. For example, FIG. 8 is also a physical machine applicable to an embodiment of the present disclosure. As shown in FIG. 1, the system architecture may include a physical machine 110. The physical machine 110 may be a server, a terminal computer, or the like. This is not limited in the present disclosure. The physical machine 110 uses an XEN virtualization architecture or a KVM virtualization architecture. This is not limited in this embodiment of the present disclosure.

The physical machine 110 may include one or more virtual machines 112 (where only one virtual machine is drawn as an example in FIG. 1), a physical storage device 114 such as a local disk or a memory, and a host machine 111. A host OS runs on the host machine 111, and the host machine 111 includes a VMM (hypervisor) 113. Certainly, the virtual machine 112 in this embodiment of the present disclosure may also call a hardware storage resource on a remote storage device. This is not limited in this embodiment of the present disclosure.

The host OS includes a storage back-end driver, a virtual storage device, and a file system. The virtual storage device includes a virtual block device and the like. The modules are configured to perform storage virtualization.

A database, an office desktop, and the like can run on the virtual machine 112. The virtual machine 112 may include a storage front-end. The storage front-end is a driver in the virtual machine 112, and is configured to drive a virtual storage device of the virtual machine 112. The storage front-end can interact with the host OS, and send data in the virtual machine 112 to the host OS.

The VMM 113 is configured to simulate a physical machine. Further, for a virtual machine that uses an XEN virtualization technology, the VMM 113 is an XEN module. For a virtual machine that uses a KVM virtualization technology, the VMM 113 is a KVM module.

The following describes several terms in a storage virtualization field in this embodiment of this application.

A block device is a fixed-sized block configured to store information. Each block has an address of the block. A basic feature of the block device is that each block can be read/written independently of another block.

A physical storage device, that is, storage hardware in a physical machine, also referred to as a physical storage device for short, and includes a physical block device. In the virtualization field, to correspond to a concept of a virtual block device, it may be considered that the physical storage device includes a control circuit and a physical block device. The control circuit, such as a driver or an interface, is configured to control read/write and a working state of the physical block device. The physical block device is a hardware structure used to store information in the physical storage device. For example, a disk is a typical physical block device.

Storage virtualization refers to expression of abstracting storage hardware resources. That is, a physical storage device virtualizes a virtual storage device for use by a virtual machine. In this way, various virtual storage devices can be flexibly virtualized for use by the virtual machine. This is not limited to the physical storage device itself. In addition, this is not limited to a physical storage device on a physical machine on which the virtualization is deployed. That is, a physical storage device of another physical machine can be used to virtualize a virtual storage device for use by the virtual machine. The method in this embodiment of the present disclosure is also applicable to a case in which physical storage devices on different nodes virtualize virtual storage devices for use by virtual machines on one physical machine.

A virtual storage device is a storage device that is virtualized using different storage protocols and that corresponds to a physical storage device. For a virtual machine that calls a virtual storage device, the virtual storage device is considered as a real virtual storage device that is created before the virtual machine runs. In addition, a host determines a correspondence between a virtual storage device and a virtual machine, that is, the host determines a virtual storage device or virtual storage devices used by a virtual machine. The virtual storage device includes a controller and a virtual block device. The controller is configured to receive a read/write request (also referred to as an I/O request, an I/O instruction, a read/write instruction, or the like) and a control instruction (such as power on, power off, or the like) that are sent by an application running on the virtual machine, and deliver the read/write request to the virtual block device. A virtual block device corresponds to a physical block device, indicates an address segment that is in the virtual storage device and that is used to store information, and represents a storage function of the virtual storage device. An address in the read/write request generated by the application in the virtual machine is usually considered as an address of the virtual block device.

For example, one physical storage device may virtualize multiple virtual storage devices. The virtual storage devices may follow different storage protocols (such as SCSI or NVMe), and have different storage capacities or different storage performance. The storage virtualization technology allows that the physical storage device and the virtual storage device use different storage protocols. The foregoing is an essential basic function of storage virtualization. Certainly, there may be a value-added function of the storage virtualization, such as a characteristic of snapshot or thin provision.

Further, for different protocols, there are different types of virtual storage devices. For example, a controller of a virtual storage device that follows the SCSI protocol is usually referred to as an SCSI controller, and usually includes one virtual block device. A controller of a virtual storage device that follows an NVMe protocol is usually referred to as an NVMe card, and may include one or more virtual block devices. However, a generality is that both controllers include a virtual block device, and have one or more arrays allocated, to process the read/write request. For the NVMe card, the virtual block device is namespace of the NVMe card, and there may be multiple virtual block devices. For the SCSI controller, the virtual block device is an SCSI logical unit number (LUN). For another example, each virtual storage device includes a transmit queue and a completion queue. The NVMe card may include one or more dynamically-allocated transmit queues and completion queues. However, the SCSI controller usually includes only one statically-allocated queue. In addition to the NVMe and SCSI protocols, a protocol of the virtual storage device further and specially includes a virtio protocol. In the virtio protocol, multiple statically-allocated queues may also be included, and a transmit queue and a completion queue of the virtio protocol are a same queue. In conclusion, a consistent generality exists regardless of various storage protocols, and a difference between protocols is merely that details and definitions are differentiated.

Similarly, a consistent generality exists between different types of physical storage devices, and only some differences lie in a specific control circuit and control manner of a physical storage device.

Figure 2:
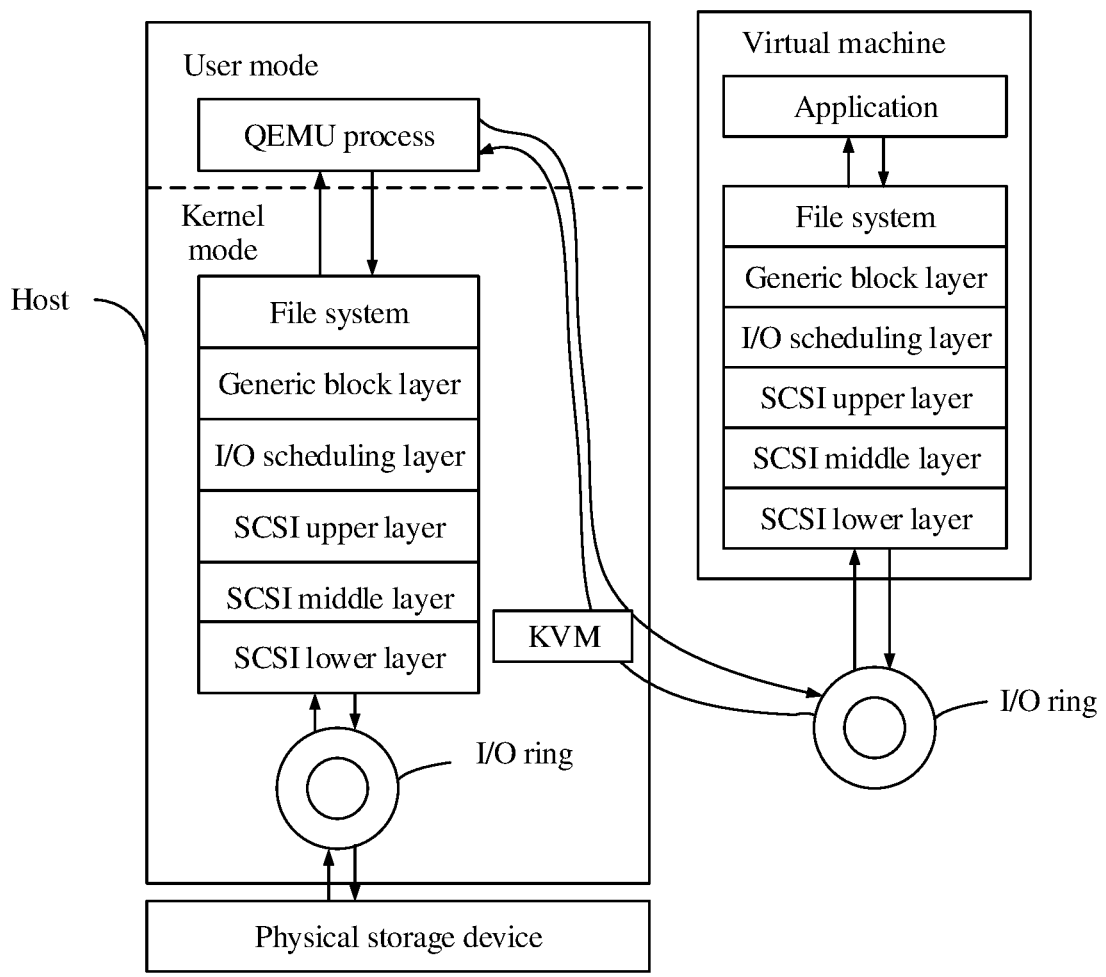
FIG. 2 is a schematic architectural diagram of read/write request processing related to an embodiment of the present disclosure.

In this embodiment of the present disclosure, a virtual machine that uses a KVM virtualization technology is used as an example with reference to FIG. 2 to describe an existing read/write instruction processing method.

In a virtualization scenario, a host is a physical machine, and multiple virtual machines are virtualized on the physical machine. A virtual machine may correspond to one or more virtual storage devices, such as a virtual disk, and types, capacities, and the like of virtual disks are different. The virtual disks are virtualized using physical storage resources. A storage resource pool may be a local storage medium that is in a host and that supports a serial attached SCSI (SAS), such as a hard disk, an NVMe disk, or a memory, or may be a remote storage area network (SAN) device. A process of providing an I/O service to the virtual disk usually exists on the host, such as a QEMU process under a KVM. Generally, one QEMU process corresponds to one virtual machine, and one QEMU process includes at least one QEMU thread and may provide a service to at least one virtual disk. One QEMU thread is responsible for processing a read/write instruction of accessing one virtual disk. For example, in a data plane technology, different I/O processes or threads are enabled in the QEMU process to provide services for different virtual disks.

In a commonly used method, an I/O procedure in which an application on the virtual machine performs storage access is relatively cumbersome and complex. After a read/write instruction of the application in the virtual machine is delivered from the application, the read/write instruction needs to be delivered to a virtual storage driver of the virtual machine using a storage software stack in the virtual machine, then a front-end driver adds the read/write instruction to an I/O ring, and the QEMU process is instructed to perform I/O processing by writing a corresponding programmable I/O (PI/O) (also referred to as a port I/O) address. First, virtual machine exit occurs on the virtual machine because the PI/O is written, and overheads of the virtual machine exit and virtual machine enter are extremely large. After the virtual machine exit, a KVM module first determines a reason for the exit, and then wakes up the QEMU process to perform I/O processing. After the QEMU process is woken up, a request is fetched from the I/O ring, and the request in the I/O ring is parsed and assembled into an I/O control block (IOCB). The request is delivered to a software stack of a host kernel in an aI/O manner. After cumbersome storage software stack processing, the request finally falls into a transmit queue of a physical storage device. The physical storage device writes a related register, and gives the request to the physical storage device for processing. After completing processing, the physical storage device wakes up a host OS using an interrupt, performs response processing by calling an interrupt processing function, and then wakes up the QEMU process using an aI/O event and a software stack. After the QEMU process is woken up, the response is fetched from the host software stack (that is located in a host kernel mode), a processing result is determined, and the response is assembled into a virtual storage I/O response and then is put to the I/O ring. Then, an interrupt is injected to the virtual machine using the KVM module. A virtual machine OS is woken up after the virtual machine receives the interrupt, response processing is performed by calling a related interrupt processing function, and finally a processing result is returned to the application in the virtual machine.

It should be noted that the software stack is a hierarchical structure of a group of cooperated software or software layers, and focuses on function integrity. When the software stack is used in different situations, different attributes are added to the software stack. For example, a storage software stack in this application is the hierarchical structure mentioned above that is of multiple software layers and that implement a read/write instruction processing function in a virtualization scenario.

It should be understood that a QEMU includes multiple QEMU processes, and there are many services that need to be processed. As a result, a load is extremely heavy. The QEMU processes may be understood as an open-source emulator and a part of a VMM. The QEMU mainly provides two functions for a user for use. One function is that the QEMU is used as a user mode emulator to execute a code different from a host architecture using a dynamic code translation mechanism. The other function is that the QEMU is used as a VMM to simulate an entire system to set, using another VMM (XEN, KVM, or the like), virtualization support provided by hardware, and to create a virtual machine that has a performance similar to host performance. When the QEMU is used as a system emulator, the QEMU simulates a virtual machine that can independently operate an OS. Each virtual machine corresponds to a QEMU process in the host, and a virtualized CPU (vCPU) of the virtual machine corresponds to a thread of the QEMU process. During system virtualization, a CPU, a memory, and an I/O device are mainly virtualized. To improve efficiency, the QEMU borrows a virtualization technology such as KVM or XEM, directly uses hardware support for virtualization, and securely runs a virtual machine code (that needs hardware support) in the host.

In the foregoing method, one back-end storage process is allocated to each virtual machine, to receive a read/write instruction delivered by an application on the virtual machine, and provide the read/write instruction for a woken QEMU process for processing. One QEMU process includes one or more QEMU threads. One virtual storage device of the virtual machine corresponds to one QEMU thread, and the process may process a to-be-processed read/write instruction in a queue of the virtual storage device. However, enter and exit of the virtual machine are used in the process. A QEMU thread is allocated to each virtual storage device, to save resources, the process hibernates when no read/write instruction needs to be processed, and the QEMU process needs to be woken up when a read/write instruction needs to be processed. Therefore, when multiple QEMU threads are working, resource contention and a lock are caused.

In an entire procedure, there are five time-consuming points, virtual machine enter and exit, QEMU wake-up overheads, switch overheads caused when the QEMU delivers a context called by an I/O system, overheads of a storage stack on a host side, wake-up overheads caused when a physical disk processes interrupt that wake up an OS. As a result, a delay in a storage process is very large.

It should be understood that the relatively complex software stack is used in the other approaches because during processing in such manner, a read/write instruction can be processed based on a framework of a virtual machine, and some functions of each layer in the foregoing software stack are used. For example, a file system belongs to a host software stack. Functions are relatively comprehensive and a structure is relatively complex because various services from a front end to a back end and control of the virtual machine by the host need to be supported. However, if a service requirement of read/write instruction processing is focused, obviously, the foregoing processing process performed using an interrupt is not brief, and generated time consumption and overheads have become a bottleneck of improving a read/write instruction processing capability.

Figure 3:
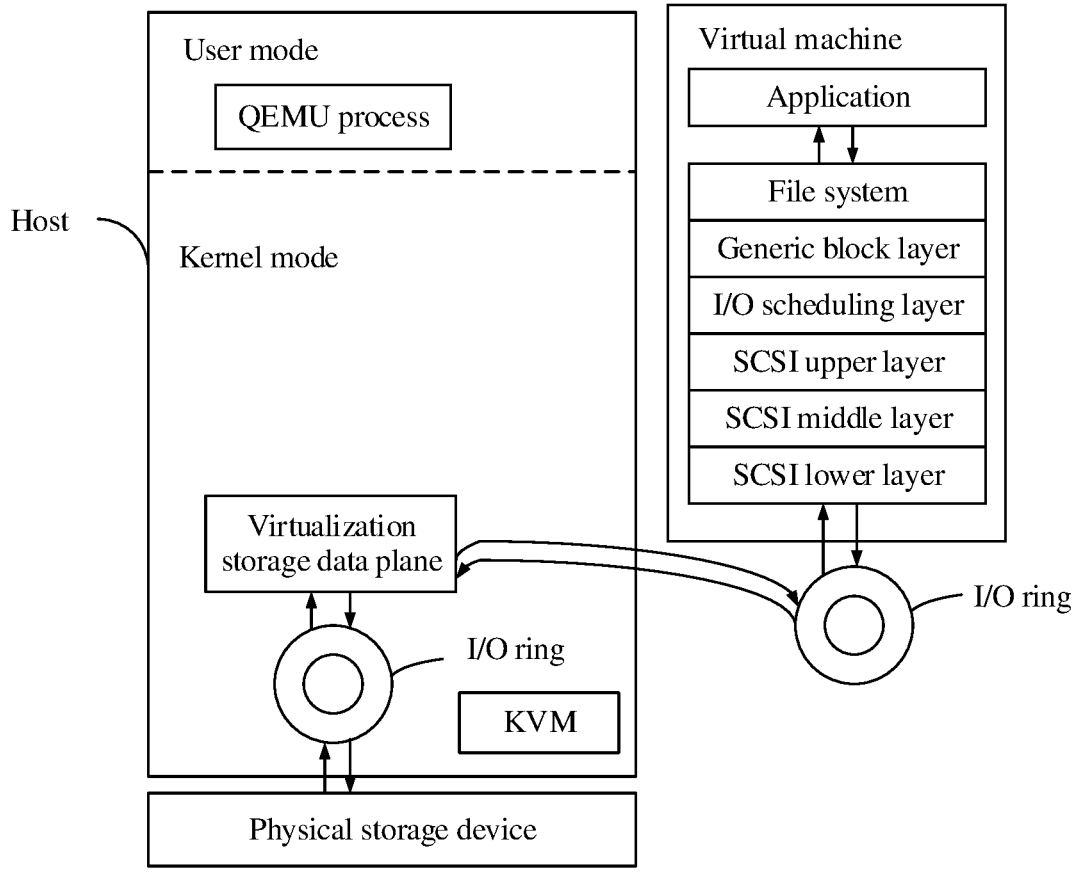
FIG. 3 is a schematic architectural diagram of read/write request processing according to an embodiment of the present disclosure.

An embodiment of the present disclosure provides a new architecture that replaces an original I/O procedure. The architecture specially aims at an I/O processing feature and requirement. An original software stack is replaced with a virtualization storage data plane. As shown in FIG. 3, a core of the virtualization storage data plane is a process for processing a read/write instruction, and may be referred to as a read/write instruction processing process. For specific explanation, refer to the summary. The process reduces wake-up and context overheads by means of polling, and performance is relatively high in order to reduce an I/O delay and improve performance. A VMCS is configured, and a manner in which a virtual machine simulates virtual memory space corresponding a virtual storage device is configured as MMIO such that virtual machine enter and exit in a read/write instruction processing process are shield. In addition, multiple original storage back-end processes are replaced with this process, and multiple back ends change to one back end or a limited quantity of back ends, thereby reducing CPU resource occupation. If the read/write instruction processing process is implemented in a kernel, context overheads in the kernel and a user mode may be further reduced. In an entire I/O process, a QEMU process is not used, and a storage virtualization function is reserved when a high-performance effect is achieved.

It is noted again that the process in this embodiment of the present disclosure of polling a queue of a virtual storage device and a queue of a physical storage device may also be a thread. This is not limited in this embodiment of the present disclosure. However, in virtualization, a thread used to provide an I/O service may be understood as a lightweight process. Therefore, for ease of expression, the following uses the process for illustration.

To avoid a QEMU process, one or more processes are used in this embodiment of the present disclosure to take charge of delivering and completing a read/write instruction in a polling manner. According to a polling I/O manner or a program control I/O manner, a process that runs in a CPU sequentially queries, in a specific period, request queues (such as a transmit queue and a response queue) of a virtual storage device and a physical storage device, and finds whether a data input or output requirement exists. If the data input or output requirement exists, the process performs a corresponding I/O service, and if the data input or output requirement does not exist, or read/write request processing is completed, the process subsequently queries a next request queue. Optionally, in this embodiment of the present disclosure, a related policy can be developed for a specific polling manner, and is used to stipulate at least one of the following specific implementation details request queues of storage devices polled by a read/write instruction processing process, a sequence in which a read/write instruction processing process polls these request queues, a polling time period, or a quantity of to-be-processed requests fetched from one request queue for processing in polling once. This embodiment of the present disclosure sets no limitation on a type of policy to be developed.

In an implementation, the read/write instruction processing process traverses all request queues in a polling manner.

Further, in some scenarios, only one read/write instruction processing process may be used. For example, few read/write instructions are delivered by an application on a virtual machine. In other scenarios, multiple read/write instruction processing processes may be used. For example, many read/write instructions are delivered by the application on the virtual machine. Polling by the one read/write instruction processing process may cause a relatively long polling time. Using the multiple read/write instruction processing processes, a policy can be developed, and a polling range and a polling implementation of the multiple read/write instruction processing processes can be determined. This is not limited in this embodiment of the present disclosure. In a case of the one read/write instruction processing process, there is no lock in an I/O procedure because resources are exclusively used. However, for a case of multiple forwarding threads, different forwarding threads manage respective virtual storage devices and physical storage devices in order to isolate resources, implement I/O processing without lock, and achieve optimal performance.

It may be understood that the method described in this embodiment of the present disclosure can run on a virtual machine with an architecture shown in FIG. 3. The QEMU process of the host is not used in a storage I/O process. A storage request from an application on the virtual machine does not need to be processed using a host software stack in the other approaches, and instead, a physical storage device writes a related register after the storage request is processed using another procedure, the storage request is sent to the physical storage device for processing (that is, the storage request is transmitted to an I/O ring between the host and the physical storage device, and the I/O ring transmits the storage request to the physical storage device), for example, a process indicated by a downward arrow in FIG. 3, and a response is returned in an opposite direction (a process indicated by an upward arrow is FIG. 3) of the foregoing process after being processed by the physical storage device. It may be logically understood that the method provided in this embodiment of the present disclosure is performed by the virtualization storage data plane shown in FIG. 3. The virtualization storage data plane may implement a storage virtualization function, and simply, multiple virtual storage devices are virtualized on multiple physical storage devices. For ease of understanding, the following simply describes the virtualization storage data plane and a function level of the virtualization storage data plane. It should be understood that the following level division is only intended to help understand steps in the method, and the level division is not limited to correspond to a structure of a device that actually performs the method of this application.

It should be noted that in an implementation, some functions of the virtualization storage data plane may be understood as functions included by the read/write instruction processing process that is used for polling.

Figure 4:
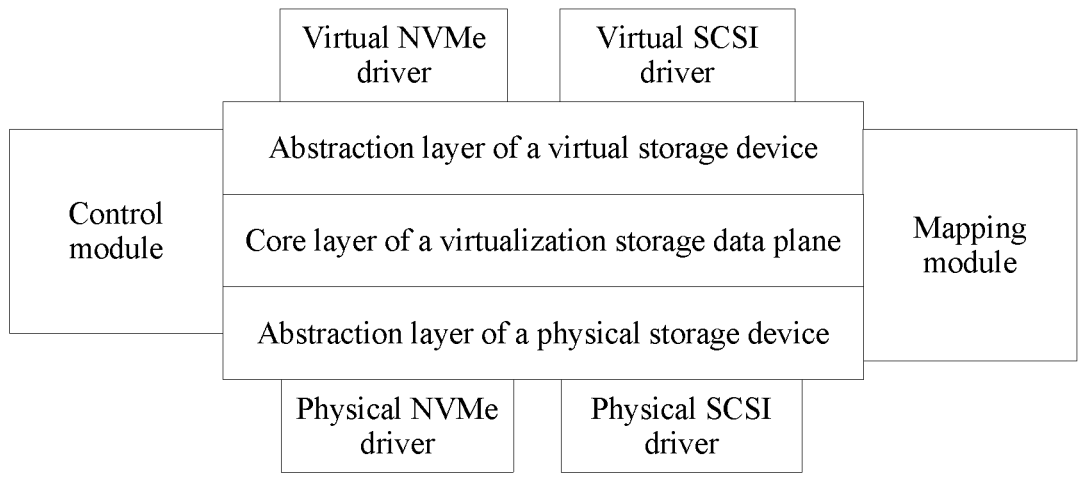
FIG. 4 is a schematic architectural diagram of read/write request processing according to an embodiment of the present disclosure.

To implement a storage virtualization function, an architecture of the virtualization storage data plane may be shown in FIG. 4. It may be considered that the virtualization storage data plane includes three components, an abstraction layer of a virtual storage device, an abstraction layer of a physical storage device, and a filter module in order to provide different virtual storage devices. To implement high performance, it may be considered that the virtualization storage data plane includes a core layer of the virtualization storage data plane. In addition, for ease of managing and using the virtual storage device and the physical storage device, a control module is introduced.

The core layer implements functions of management (establishment, deletion, and scheduling in the read/write instruction processing process) of the read/write instruction processing process, and management (establishment, deletion, request application, request release, and a splitting request) of a request memory pool. The memory pool is a memory resource allocated to a read/write request.

As described above, a generality exists between virtual storage devices with different protocols. Therefore, the abstraction layer of the virtual storage device may perform abstraction on the virtual storage device to obtain a unified simulation, management, and operation method, that is, directly manage a queue and a virtual block device (including new queue establishment, original queue release, and the like). Further, establishment, deletion, query of the virtual storage device are also implemented, and a unified processing request, processing response, response notification method of different virtual storage devices are implemented. A registration method and a registration removing method are provided for a specific virtual storage driver.

The abstraction layer of the physical storage device may perform abstraction on the physical storage device to obtain unified driver combination in order to perform unified management. A consistent generality exists between physical storage devices of different types, and only some differences need to be provided in a driver of a specific physical storage device. The abstraction layer of the physical storage device implements a unified PCI driver entry, and provides unified management for the driver of the specific physical storage device such that different physical storage devices can be driven. Specific management includes at least one of registration, registration removing, establishment, deletion, query, and the like of the physical storage device. The abstraction layer of the physical storage device may further deliver a unified request, a unified notification, and a unified processing response to the physical storage device.

The abstraction layer of the virtual storage device and the abstraction layer of the physical storage device provide a basis for virtualizing different virtual storage devices from specific physical storage devices. For example, a virtual SCSI device can be virtualized from an NVMe card, and a virtualization capability is provided. The control module provides a unified management interface for a user, and may include at least one of management interfaces that are of the virtual storage device and the physical storage device and that provide establishment, deletion, query, and the like. The filter module may be configured for storage I/O mapping, advanced feature insertion and deletion, establishment, deletion, and query of a mapping logic device, and the like. The filter module may be understood as a hook in a read/write request processing process.

Figure 5:
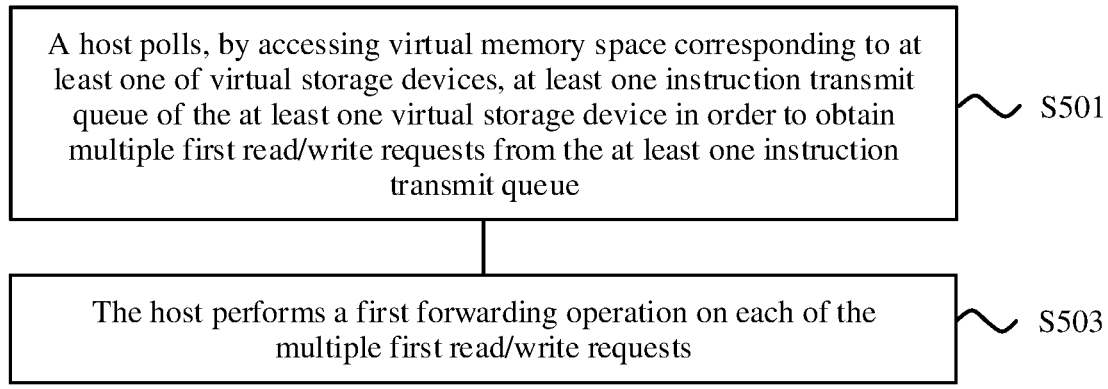
FIG. 5 is a schematic flowchart of a read/write request processing method according to an embodiment of the present disclosure.

With reference to FIG. 5, the following further describes a method for processing a read/write request in a physical machine. The physical machine includes a physical storage device, a host machine, and a virtual machine. The physical machine provides, based on a virtual storage device virtualized by the physical storage device, a storage service to the virtual machine.

It should be noted that for clarity of description, the method is presented in the following steps using a read/write instruction processing process. In practice, in a polling process of the read/write instruction processing process, operations of the following steps are separately performed on multiple to-be-processed read/write requests that need to be processed in the read/write instruction processing process, that is, one read/write request is first processed, and then a next read/write request is fetched, and so on. For example, queues of multiple virtual storage devices are allocated to the read/write instruction processing process according to a processing policy. For another example, all queues are traversed to process all to-be-processed read/write requests. According to the method in this embodiment of the present disclosure, a storage service is not provided for a virtual machine in an interrupt manner, or using a user mode QEMU process. Multiple read/write requests can be processed in parallel in a read/write instruction processing process. A service is provided for the virtual machine in the read/write instruction processing process in a polling manner. Correspondingly, for a physical storage device, the read/write instruction processing process is a process of disabling an interrupt and providing services in a polling manner.

The method in this embodiment of this application includes the following steps.

Step S501. The host polls, by accessing virtual memory space corresponding to at least one of virtual storage devices, at least one instruction transmit queue of the at least one virtual storage device in order to obtain multiple first read/write requests from the at least one instruction transmit queue, where the virtual memory space is simulated by the host in an MMIO manner, the first read/write requests are from an application that runs on the virtual machine, and the first read/write requests include information about a target virtual storage device.

Further, each virtual storage device includes at least one instruction transmit queue and at least one instruction response queue.

In an implementation, the host pulls up a read/write instruction processing process, traverses at least one instruction transmit queue of the at least one virtual storage device, and obtains at least one read/write request that needs to be processed. The at least one read/write request includes the first read/write request. A storage protocol followed by the first read/write request is the same as a storage protocol followed by a virtual storage device corresponding to the first read/write request, and may be virtio, SCSI, NVMe, or the like. This is not limited in this embodiment of this application.

It should be noted that because a virtual block device in the virtual storage device includes a storage address range, a physical block device in the physical storage device also includes a storage address range, and an address of the virtual block device in the virtual storage device is usually used to indicate an address of the virtual storage device. Therefore, a mapping relationship between information about a virtual storage device and information about a physical storage device may be equivalent to a mapping relationship between information about a virtual block device in a virtual storage device and information about a physical block device in a physical storage device, or a correspondence between a virtual block device and a physical block device. A virtual storage device may be described, using the following languages, as being virtualized by a physical storage device. The virtual storage device includes a virtual block device, or it may be considered that the virtual storage device can virtualize a virtual block device. If the virtual block device is further subdivided according to a corresponding address segment, it may be considered that one virtual block device includes multiple child virtual block devices, or it may be considered that multiple virtual block devices are virtualized on one virtual block device. A purpose of the virtual storage device is that the virtual machine can correspond to a call object, that is, the virtual machine learns of a virtual storage device to which a read/write instruction should be sent. Specific parameters in the virtual storage device such as an address and a storage space size (a storable data length) are presented using one or more virtual block devices corresponding to the virtual storage device. In this way, the read/write instruction carries an ID of a target virtual block device, and the ID is used to indicate a to-be-read/written virtual address.

In conclusion, in this embodiment of the present disclosure, expression forms of an address of the virtual storage device and an address of the physical storage device are not limited, and expression forms of an ID of the virtual storage device and an ID of the physical storage device are not limited in this embodiment of the present disclosure. For example, the address of the virtual storage device may also be represented using an address of a virtual block device in the virtual storage device or using an address and an ID that are of a virtual block device in the virtual storage device, and an ID of the virtual storage device may also be represented using information (the address, or the ID, or the like) about the virtual block device in the virtual storage device. According to the mapping relationship, the host can determine, by means of processing on a read/write request, a location of data that should be read/written in the physical storage device in order to complete processing on the read/write request. A specific form of the mapping relationship is not limited in this embodiment of this application. The virtual block device includes concepts of the ID, the address, and the length such that the virtual block device can correspond to a physical address in the physical storage device. For example, one 10 gigabytes (GB) virtual block device can be virtualized on one NVMe card.

The virtual machine may determine, using the information about the target virtual storage device, a virtual storage device queue in which the first read/write request should be put. The physical machine further maintains a mapping relationship between a virtual block device and a virtual storage device. For example, in a relatively common implementation, an ID of the target virtual block device or the like may indicate ID information of the virtual block device and a relative address in the target virtual block device, that is, possible addresses of virtual block devices are from 0 to 10 G, and addresses in all virtual block devices need to be distinguished using the ID of the virtual block device or an absolute address that is of a character of the virtual block device and is in a series of virtual block devices (for example, a first block device is 0, a second block device is 10 GB, and a third block device is 20 GB). For another example, in another embodiment, the ID may be directly an absolute address of the virtual block device. This is not limited in this embodiment of this application.

A person skilled in the art should also understand that a read/write request generally includes length information of to-be-read/written data, and the length information may be used together with an ID of a read/written target virtual block device to indicate a to-be-read/written data range.

It should be noted that the read/write instruction processing process may be understood as an implementation of a core layer of the virtualization storage forwarding plane mentioned above.

Step S503. The host performs a first forwarding operation on each of the multiple first read/write requests, where the first forwarding operation includes generating, by the host according to the information about the target virtual storage device included in the first read/write request and a mapping relationship between the information about the target virtual storage device and information about a target physical storage device, a second read/write request corresponding to the first read/write request, where the second read/write request includes the information about the target physical storage device, and adding, by the host, the second read/write request to an instruction transmit queue of the target physical storage device according to the information about the target physical storage device such that the target physical storage device obtains the second read/write request from the instruction transmit queue, and performs a read/write operation according to the second read/write request.

In this way, a host may actively poll an instruction transmit queue of a virtual storage device to obtain a first read/write request delivered by an application, and forward a processed first read/write request to an instruction transmit queue of a target physical storage device. The other approaches in which a QEMU process of the host is woken up by means of virtual machine exit, and a read/write request is processed by a software stack is avoided. Virtual machine exit and enter are not needed in the polling process. Further, virtual memory space corresponding to the virtual storage device is accessed in an MMIO manner such that the virtual machine exit is avoided. The QEMU process is replaced with a read/write request processing process, and a read/write request is obtained in the process in a polling manner, thereby simplifying a process of processing a read/write request by the host, increasing a speed of processing a read/write request by software, and reducing a delay of processing the read/write request by the software.

Further, generating, by the host according to the information about the target virtual storage device included in the first read/write request and a mapping relationship between the information about the target virtual storage device and information about a target physical storage device, a second read/write request corresponding to the first read/write request may include the following steps of determining, by the host, the information about the target physical storage device according to the information about the target virtual storage device included in the first read/write request and the mapping relationship between the information about the target virtual storage device and the information about the target physical storage device, and generating, by the host, the second read/write request corresponding to the first read/write request, where the second read/write request includes the information about the target physical storage device, and a format of the second read/write request matches the target physical storage device.

Therefore, the host may analyze content of a read/write request in a unified manner, and can perform centralized processing regardless of storage protocols followed by the first read/write request and the second read/write request. It is also convenient for the virtual storage device of different storage protocols, and the read/write request processing process may obtain the first read/write request for processing without distinguishing storage protocols of different virtual storage devices.

It should be noted that the step represented by S503 may be correspondingly processed by the filter module mentioned above. A function of the filter module is similar to that of a logical volume layer of a LINUX kernel. Different storage protocols may be used in a parsing process and an encapsulation process. An encapsulation protocol used in the parsing process is determined according to the information about the target virtual storage device, and an encapsulation protocol used in the encapsulation process is determined according to the information about the target physical storage device.

The filter module maintains a mapping table between a virtual block device and a physical storage device, and provides a related advanced feature.

It should be noted that the host continuously performs at least one of the following operations by means of polling, obtaining multiple read/write requests from an instruction transmit queue or obtaining multiple read/write responses from an instruction response queue. Further, there may be two manners for obtaining a request and/or response (and/or indicates "and" or "or") by means of polling, and processing multiple obtained requests and/or responses. One request or response is obtained in a polling manner, then processing is performed, and a next request or response is obtained after processing, and so on. Alternatively, multiple requests or responses are obtained in a polling manner, and then processing is performed. For one read/write request processing process, read/write requests can be processed one by one. For multiple read/write request processing processes, multiple read/write requests can be processed in parallel. An implementation is not limited in this embodiment of the present disclosure.

It should be noted that a read/write request generally includes length information of to-be-read/written data. In an implementation, the method further includes obtaining, by the host, a third read/write request from the at least one instruction transmit queue by means of polling, where the third read/write request includes a length of the to-be-read/written data and information about a read/written virtual storage device, the read/written virtual storage device includes a read/written target virtual block device, and the length of the to-be-read/written data is greater than or equal to a readable/writable address range of the read/written target virtual block device, generating, by the host, a response to the third read/write request, and adding, by the host, the response to the third read/write request to an instruction response queue of the read/written virtual storage device, where the response to the third read/write request indicates that a read/write operation corresponding to the third read/write request fails.

In an implementation, because different virtual storage device may follow different storage protocols, such as virtio, SCSI, or NVMe, read/write requests corresponding to the different virtual storage devices also follow different protocols. The first read/write request is parsed into content in a unified format according to a protocol of the first read/write request. The read/write request content in the unified format includes the information about the target virtual storage device. The read/write request content in the unified format is changed into the information about the target physical storage device according to the mapping relationship between the information about the target virtual storage device and the information about the target physical storage device. The first read/write request is parsed herein in order to implement unified management on virtual storage devices of different storage protocols. Correspondingly, modified content in a unified format is encapsulated because different physical storage devices may follow different storage protocols, such as the virtio, SCSI, or NVMe.

It should be noted that there may be multiple methods to obtain information about a target physical storage device according to mapping between information about a target virtual storage device and information about a target physical storage device. This is not limited in this embodiment of the present disclosure. In an implementation, an address in information is mapped using a linear mapping method. Further, an initial address in information about a target virtual storage device is added by an initial offset of linear mapping, and an ID in the information about the target virtual storage device in a read/write request is replaced with an ID of a corresponding target physical storage device according to a mapping relationship.

Optionally, in an implementation, the modified content in the unified format may also be used as a fourth read/write request, and is added to a waiting queue of a physical storage device corresponding to the fourth read/write request. In a read/write instruction processing process, to-be-processed read/write requests are fetched by polling at least one waiting queue of at least one physical storage device of the physical machine, and physical storage devices to which the to-be-processed read/write requests are respectively sent are determined according to a corresponding scheduling method. A specific scheduling method is not limited in this embodiment of the present disclosure. The to-be-processed read/write requests include the fourth read/write request. Protocol encapsulation is performed on the to-be-processed read/write requests using corresponding storage protocols, and encapsulated read/write requests are obtained. The host performs pre-processing such as DMA mapping, and calls a command in a corresponding protocol to put encapsulated read/write requests to a transmit queue of a corresponding physical storage device. The encapsulated read/write requests include the second read/write request.

The foregoing read/write instruction processing process may also process instructions other than the read/write requests in the foregoing instruction transmit queue. The instructions only need to be processed by a virtual storage device, and do not need to be transmitted to a physical storage device. In this way, according to the read/write instruction processing process in this embodiment of this application, various storage-related instructions of an application on a virtual machine may be satisfied, an application limitation brought due to an instruction type is avoided, a problem caused when a read/write instruction is selected to be processed using a mechanism in this embodiment of the present disclosure is also exempted, a polling mechanism of the read/write instruction processing process is more fluent, and a delay caused when an instruction other than a read/write request is processed in the other approaches by means of virtual machine enter and exit is reduced.

The foregoing read/write instruction processing process parses a to-be-processed instruction in at least one instruction transmit queue of the at least one virtual storage device by calling a corresponding storage protocol. For a to-be-processed instruction that does not need to be delivered to the physical storage device, the virtual storage device calls a command in a corresponding protocol for processing, encapsulates a result obtained after processing into a response according to a protocol corresponding to the to-be-processed instruction, and puts the response to a corresponding virtual storage device for assembling.

Whether the to-be-processed instruction is a read/write request can be determined according to a parameter in the to-be-processed instruction such that the to-be-processed instruction is processed in different manners. Parameters are different for different storage protocols. For example, for a SCSI protocol, whether the to-be-processed instruction is a read/write request is determined according to a type of an operation code, and for an NVMe protocol, whether the to-be-processed instruction is a read/write request is determined according to a transmit queue ID. For an instruction that does not need to be delivered to the physical storage device for processing, such as a report LUN command of SCSI, or an establishment queue command of NVMe, the instruction may be parsed by calling a corresponding storage protocol, a processing result is assembled into a response according to the corresponding storage protocol method, and then the response is put into a completion queue of the virtual storage device.

It should be understood that the host calls a unified PCI driver to call and manage the at least one physical storage device in order to process a read/write request from the virtual machine. Further, it may be considered as an implementation of an abstraction layer of the foregoing physical storage device. Simply, in terms of the method, before the instruction is delivered, first, a physical storage device is loaded by a unified PCI driver provided by the host. In a process of loading a physical storage device driver, the physical storage device driver is registered (which may be understood as registration to an abstraction layer of a physical storage device). A specific process includes adding an ID table of a PCI device managed by the physical storage device driver to an ID list of the unified PCI driver, triggering a PCI bus scanning device, calling a loading device function of the unified PCI driver once a PCI device that matches an ID is found in a scanning process, and calling a specific method for loading a physical storage device driver in the loading function to load a device.

Further, the process may further include the following steps in order to form a complete process in which the host gives a complete response to a read/write request delivered by an application on a virtual machine. Further, the following steps are a feedback process in which the host returns a read/write response to the virtual machine after the physical storage device completes a read/write operation corresponding to the delivered read/write request.

Figure 6:
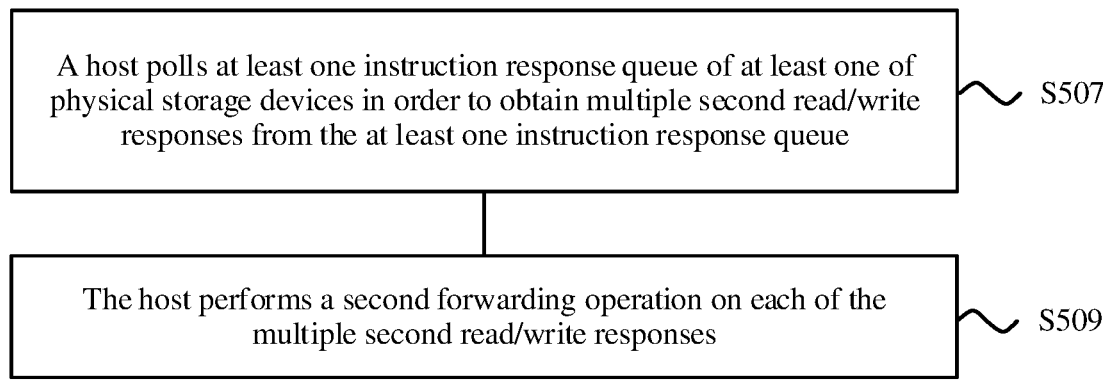
FIG. 6 is a schematic flowchart of a read/write response processing method according to an embodiment of the present disclosure.

In an embodiment, as shown in FIG. 6, step S507 and S509 in the following process may be used independently as a read/write response processing method.

For corresponding steps or same nouns in steps S501 and S503, refer to descriptions of the corresponding steps or the same nouns in steps S501 and S503, and for brevity, repeated explanation is not described in the following process. It should be noted that IDs of steps S501 to S509 are merely used to indicate steps for ease of description.

Step S507. The host polls at least one instruction response queue of at least one of physical storage devices in order to obtain multiple second read/write responses from the at least one instruction response queue, where an interrupt of the at least one instruction response queue is a disabled state or a processor of the physical machine is configured for ignoring an interrupt request of the at least one instruction response queue, the second read/write responses indicate that a target physical storage device has performed a read/write operation, and the second read/write responses include the information about the target physical storage device.

Step S509. The host performs a second forwarding operation on each of the multiple second read/write responses, where the second forwarding operation includes generating, by the host according to the information about the target physical storage device and the mapping relationship between the information about the target physical storage device and the information about the target virtual storage device, a first read/write response corresponding to the second read/write response, where the first read/write response includes the information about the target virtual storage device, and adding, by the host, the first read/write response to an instruction response queue of the target virtual storage device according to the information about the target virtual storage device such that the application obtains the first read/write response.

Further, generating, by the host according to the information about the target physical storage device and the mapping relationship between the information about the target physical storage device and the information about the target virtual storage device, a first read/write response corresponding to the second read/write response includes determining, by the host, the information about the target virtual storage device according to the information about the target physical storage device and the mapping relationship between the information about the target physical storage device and the information about the target virtual storage device, and generating, by the host, the first read/write response corresponding to the second read/write response, where the first read/write response includes the information about the target virtual storage device, and a format of the first read/write response matches the target virtual storage device.

It should be noted that the step represented by step S509 may be correspondingly processed by the filter module mentioned above. A function of the filter module is similar to that of a logical volume layer of a LINUX kernel, and is used to maintain a mapping table between a virtual block device and a physical storage device, and to provide a related advanced feature.

It should be noted that steps S501 to S509 in the foregoing embodiment represent two parts in which the host calls a physical storage device to respond to a read/write request, that is, a delivering process and a feedback process. Generally, in specific implementation, the host processes a read/write request using the complete method. However, it is not limited in this embodiment of the present disclosure that the method corresponding to steps S501 and S503 is used in the delivering process and another method is used in the feedback process, or another method is used in the delivering process and steps S507 and S509 are used in the feedback process to implement the complete response process.

In conclusion, according to the foregoing read/write request processing method, a to-be-processed read/write request is obtained from at least one instruction transmit queue of at least one virtual storage device in a polling manner, a read/write request corresponding to the to-be-processed read/write request is added to a transmit queue of a target physical storage device, and after a corresponding target physical storage device performs a corresponding read/write operation and returns a response, the response is finally transmitted to an instruction response queue of a virtual storage device in the polling manner such that a virtual machine obtains the response. Therefore, a process of processing a read/write request by a host is simplified, a speed of processing a read/write request by software is increased, and a delay of processing the read/write request by the software is reduced, thereby improving storage performance in a virtualization scenario. Further, when a QEMU process is replaced with an independent process to process multiple virtual storage devices, lock contention between threads in the QEMU process in an original method can also be avoided.

Further, it should be noted that four steps from steps S501 to S509 are in a logic order. Because a read/write instruction processing process is a polling mode, and a disabling interrupt manner is used for a physical storage device managed in the read/write instruction processing process, in a practical code running process in an embodiment, the foregoing four steps from steps S501 to S509 can be continuously performed in the read/write instruction processing process such that a read/write request and a read/write response are continuously processed. For example, in a while statement execution case, sequences of four steps are not limited in encoding, and are unnecessarily performed according to the foregoing sequence. Because multiple read/write requests can be processed in parallel by means of polling in multiple read/write instruction processing processes (one read/write request or read/write response is processed in one process at one moment). In terms of code execution, different read/write requests correspond to different steps in one time point, that is, the foregoing several steps are simultaneously performed in the multiple read/write instructions processing processes.

In addition, a resource waste caused in a polling process can be reduced using the following method in polling when no instruction (that is mainly a read/write instruction) is processed in a period of time, the host actively schedules the read/write instruction processing process without occupying CPU for a long time. Correspondingly, a relatively short scheduling time needs to be set for obtaining a response in a short time when an emergent instruction (that is mainly the read/write instruction) is arriving. Further, a relatively short scheduling time can be set using a manner, for example, using a timer or a clock interrupt. This is not limited in this embodiment of the present disclosure.

A method in which to meet a basic requirement of virtualization storage, that is, to implement resource sharing and resource partition, the host creates and manages a virtual block device and a virtual storage device before establishing a virtual machine is simply described. The method further includes the following steps. According to the method described in the following steps, multiple virtual storage devices can share a resource requirement of one physical storage device, and one virtual storage device corresponds to multiple virtual block devices, or reasonable division and management of storage resources of a physical storage device can be implemented. The method is in common use for various storage protocols. Serial numbers of the following steps merely indicate steps, but do not limit a sequence between the steps.

Step S601. The host creates the at least one virtual storage device.

Further, a virtual storage device is created, and a device type (such as NVMe or SCSI) is specified. In terms of function, it may be considered that a control module in a virtualization storage data plane provides an interface. Further, the control module proposes an establishment request to a core layer of the virtualization storage data plane, and an establishment action is completed by the core layer.

Step S602. Create at least one virtual block device, where each virtual block device in the at least one virtual block device corresponds to one physical storage device in the at least one physical storage device.

Further, an interface is called to create a virtual block device. Different establishment methods require different parameters. A specific method and parameters are not limited in this embodiment of the present disclosure. A linear mapping method is used as an example. An initial address, a physical storage device (or another virtual block device, the virtual block device needs to be created first in case of the virtual block device), and a length of the virtual block device need to be entered. It should be understood that a virtual block device cannot provide a simulation function for a virtual storage device, and the virtual block device works only when the virtual block device is assigned to the virtual storage device. In terms of function, it may be considered that the control module in the virtualization storage data plane provides an interface, or may be considered that the control module proposes an establishment request to a filter module, and an establishment action is completed by the filter module.

Step S603. Determine a mapping relationship between the at least one virtual storage device and the at least one virtual block device, where the at least one virtual storage device corresponds to the at least one virtual block device.

Further, an interface is called, and the virtual block device created in step S602 is allocated to a corresponding virtual storage device. For different protocols, methods for allocating a block device are different, and required parameters are also different. This is not limited in this embodiment of the present disclosure. For example, block device allocation of the NVMe means namespace establishment of the NVMe, and a related protocol parameter such as a namespace number needs to be assigned, and block device establishment of SCSI means establishment of a SCSI LUN, and related protocol parameters such as the SCSI LUN and an hctl number need to be assigned. In terms of function, it may be considered that the control module in the virtualization storage data plane provides an interface.

Step S604. Configure the at least one virtual storage device for the virtual machine in order to provide a read/write service to the virtual machine.

Further, the created virtual storage device is configured for the virtual machine for using as a virtual disk.

To better describe the read/write request processing method provided in this embodiment of the present disclosure, the following describes an implementation of the method using an example. An NVMe protocol is used as an example, that is, both a virtual storage device and a physical storage device are NVMe devices. In the protocol, one virtual storage device may include multiple virtual block devices.

A read/write instruction processing process of a host polls (traverses in an implementation) a doorbell bar area of a virtual NVMe card (corresponding to a virtual storage device), at least one NVMe instruction is obtained from at least one queue of the doorbell bar area, and whether each of the at least one NVMe instruction is from a transmit queue 0 is separately determined. For NVMe instructions from the transmit queue 0, operation instructions in the NVMe instructions are read and performed, and for example, the operation instructions may be establishing and sending a queue. Corresponding response messages are separately generated after the NVMe instructions are performed, and the generated response messages are put to an instruction response queue 0. A tail pointer of the instruction response queue 0 is increased, and it is configured that a status of the instruction response queue 0 is that the virtual machine needs to be notified. For at least one NVMe instruction that is not from the transmit queue 0, the at least one NVMe instruction is an NVMe read/write command, and each NVMe read/write command is parsed according to the NVMe protocol in order to obtain a read/write request after protocol parsing. Mapping is performed on an address of each read/write request by calling a mapping function in order to obtain at least one read/write request that carries an address of a corresponding physical storage device. The at least one read/write request obtained after mapping is put to at least one waiting linked list of the corresponding physical storage device, and the at least one read/write request obtained after mapping is fetched from the waiting linked list by means of polling. The at least one read/write request is assembled into an NVMe read/write instruction according to the NVMe protocol, the NVMe read/write instruction is put to at least one transmit queue of at least one physical storage device, and a tail pointer of each transmit queue to which the read/write instruction is put is increased. A doorbell area of each corresponding physical storage device is written, and each corresponding physical storage device is instructed to process at least one corresponding assembled NVMe instruction. After completing a corresponding read/write operation, each corresponding physical storage device returns a corresponding response to an instruction response queue of each corresponding physical storage device, and one response is returned for each NVMe instruction. By means of polling of forwarding threads, each response is put to at least one instruction return queue of at least one virtual storage device corresponding to each response. It is configured that a status of the at least one instruction return queue is that notification is required, and for all completion queues that need to be notified, a corresponding interrupt is sent to the virtual machine.

In a specific scenario, a physical machine includes a physical storage device, a host machine, and a virtual machine. The physical machine provides a storage service to the virtual machine according to a virtual storage device virtualized by the physical storage device. In addition, physical storage devices virtualize the virtual storage devices in a one-to-one correspondence manner, and information about a virtual storage device is the same as information about a physical storage device corresponding to the virtual storage device. In this case, the virtual storage device is a storage device sensed by the virtual machine. It may be technically considered that the physical storage device is not virtualized into the virtual storage device in practice, and only an upper-layer virtual machine considers that the upper-layer virtual machine calls the virtual storage device. In this scenario, it may be considered that a storage virtualization performance requirement is not met, or this scenario may be considered as a virtualization storage scenario. The method described in this embodiment of the present disclosure may be also applicable to the scenario after adaptability modification. A read/write request processing speed in a virtualization storage scenario can be increased in this specific scenario, and an I/O delay can be reduced. Further, the method for processing a read/write request in the physical machine in this scenario includes polling, by the host by accessing virtual memory space corresponding to at least one of virtual storage devices, at least one instruction transmit queue of the at least one virtual storage device in order to obtain multiple read/write requests from the at least one instruction transmit queue, where the virtual memory space is simulated by the host in an MMIO manner, the read/write requests are from an application that runs on the virtual machine, and the read/write requests include information about a target physical storage device, and performing, by the host, a first forwarding operation on each of the multiple read/write requests, where the first forwarding operation includes adding, by the host, the read/write request to an instruction transmit queue of the target physical storage device according to the information about the target physical storage device such that the target physical storage device obtains the read/write request from the instruction transmit queue, and performs a read/write operation according to the read/write request.

Optionally, the method further includes polling, by the host, at least one instruction response queue of the at least one physical storage device in order to obtain multiple read/write responses from the at least one instruction response queue, where an interrupt of the at least one instruction response queue is a disabled state or a processor of the physical machine is configured for ignoring an interrupt request of the at least one instruction response queue, the read/write responses indicate that a target physical storage device has performed a read/write operation, and the read/write responses include information about the target physical storage device, and performing, by the host, a second forwarding operation on each of the multiple read/write responses, where the second forwarding operation includes adding, by the host, the read/write response to an instruction response queue of a target virtual storage device according to the information about the target physical storage device such that the application obtains the read/write response.

Similar to the previous scenario, this part of optional steps may be used independently as a read/write response processing method.

Because only an application scenario is changed, for technical details of a read/write request processing method and a read/write response processing method in this scenario, refer to description above, that is, content corresponding to FIG. 1 to FIG. 6.

Figure 7:
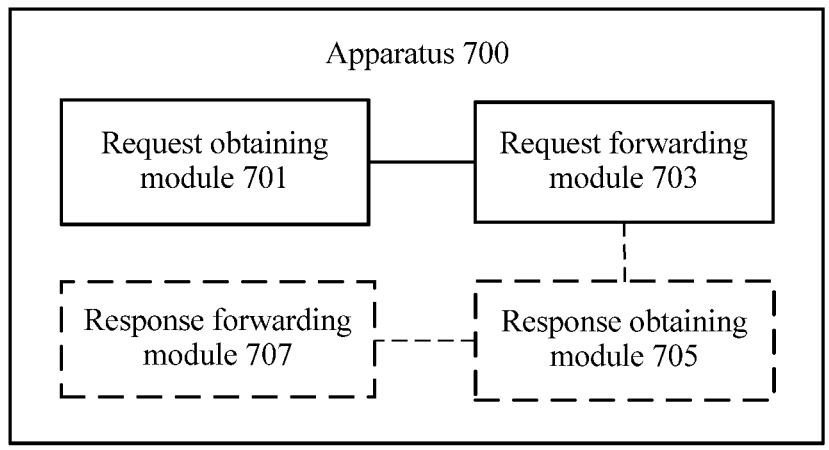
FIG. 7 is a schematic diagram of a read/write request processing apparatus according to an embodiment of the present disclosure.

FIG. 7 is a schematic block diagram of a read/write request processing apparatus 700 according to an embodiment of the present disclosure. The apparatus 700 runs on a physical machine. The physical machine further includes a hardware layer and a virtual machine. The hardware layer includes a physical storage device, and the physical storage device is configured to virtualize a virtual storage device for using by the virtual machine. The apparatus 700 includes a request obtaining module 701 configured to poll, by accessing virtual memory space corresponding to at least one of virtual storage devices, at least one instruction transmit queue of the at least one virtual storage device in order to obtain multiple first read/write requests from the at least one instruction transmit queue, where the virtual memory space is simulated by the host in an MMIO manner, the first read/write requests are from an application that runs on the virtual machine, and each first read/write request includes information about a target virtual storage device, and a request forwarding module 703 configured to perform a first forwarding operation on each of the multiple first read/write requests, where the first forwarding operation includes generating, according to the information about the target virtual storage device and a mapping relationship between the information about the target virtual storage device and information about a target physical storage device, a second read/write request corresponding to the first read/write request, where the second read/write request includes the information about the target physical storage device, and adding the second read/write request to an instruction transmit queue of the target physical storage device according to the information about the target physical storage device such that the target physical storage device obtains the second read/write request from the instruction transmit queue, and performs a read/write operation according to the second read/write request.

In this way, the apparatus 700 may actively poll an instruction transmit queue of a virtual storage device to obtain a first read/write request delivered by an application, and forward a processed first read/write request to an instruction transmit queue of a target physical storage device. The other approaches in which a QEMU process of a host is woken up by means of virtual machine exit, and a read/write request is processed by a software stack is avoided. Virtual machine exit and enter are not needed in the polling process. Further, virtual memory space corresponding to the virtual storage device is accessed in an MMIO manner such that the virtual machine exit is avoided. The QEMU process is replaced with a read/write request processing process, and a read/write request is obtained in the process in a polling manner, thereby simplifying a process of processing a read/write request by the host, increasing a speed of processing a read/write request by software, and reducing a delay of processing the read/write request by the software.

Optionally, the apparatus 700 further includes a response obtaining module 705 configured to poll at least one instruction response queue of at least one of physical storage devices in order to obtain multiple second read/write responses from the at least one instruction response queue, where an interrupt of the at least one instruction response queue is a disabled state or a processor of the physical machine is configured for ignoring an interrupt request of the at least one instruction response queue, the second read/write responses indicate that a target physical storage device has performed a read/write operation, and the second read/write responses include the information about the target physical storage device and, a response forwarding module 707 configured to perform a second forwarding operation on each of the multiple second read/write responses, where the second forwarding operation includes generating, according to the information about the target physical storage device and the mapping relationship between the information about the target physical storage device and the information about the target virtual storage device, a first read/write response corresponding to the second read/write response, where the first read/write response includes the information about the target virtual storage device, and adding the first read/write response to an instruction response queue of the target virtual storage device according to the information about the target virtual storage device such that the application obtains the first read/write response.

In this application scenario, the apparatus 700 is an apparatus corresponding to the methods in FIG. 5 and FIG. 6. For further description and illustration related to the apparatus 700, refer to content of the second aspect in the summary and corresponding content in FIG. 5 and FIG. 6, and details are not described herein again.

In this way, the apparatus 700 adds a first read/write response to a first read/write request to an instruction response queue of a target virtual storage device to form a complete processing process of returning a response according to a request, and also obtains a second read/write response from an instruction response queue of a physical storage device in a polling manner. Based on the foregoing technical solutions, an instruction transmit queue of a virtual storage device is polled, thereby simplifying a process of processing a read/write request by a host, increasing a speed of processing a read/write request by software, and reducing a delay of processing the read/write request by the software.

It should be noted that division of the foregoing modules is only illustrative expression, and no limitation is constituted. For example, the response obtaining module 705 and the request obtaining module 701 may be a same module, and the response forwarding module 707 and the request forwarding module 703 may be a same module.

It should be further noted that the response obtaining module 705 and the response forwarding module 707 may be used independently as a composition part of a read/write response processing apparatus. As shown in FIG. 8, in this way, the apparatus 800 is based on the foregoing technical solutions. An instruction response queue of a physical storage device is polled using a process, thereby simplifying a read/write response processing process, increasing a speed of processing a read/write response by software, and reducing a delay of processing the read/write response by the software. Therefore, an application can receive a delivered read/write response more quickly.

It should be understood that the apparatus 700 may correspondingly perform the read/write request processing method described according to this embodiment of the present disclosure, and the apparatus 700 may be considered as an implementation of a new architecture mentioned above that replaces an original I/O procedure. In addition, descriptions and other operations and/or functions of all modules in the apparatus 700 are separately used to implement corresponding procedures of the methods from FIG. 5 to FIG. 6, and the modules can run on a virtual machine in an architecture shown in FIG. 1 and FIG. 3. For example, the apparatus 700 may be understood as an implementation of a virtualization storage data plane. Therefore, reference may be made to related descriptions in FIG. 1, FIG. 3, FIG. 5, and FIG. 6. For brevity, same content and a corresponding technical effect are not described herein.

In a specific scenario, a physical machine includes a physical storage device, a host machine, and a virtual machine. The physical machine provides, based on a virtual storage device virtualized by the physical storage device, a storage service to the virtual machine. In addition, physical storage devices virtualize a virtual storage devices in a one-to-one correspondence manner, and information about a virtual storage device is the same as information about a physical storage device corresponding to the virtual storage device. In this case, the virtual storage device is a storage device sensed by the virtual machine. It may be technically considered that the physical storage device is not virtualized into the virtual storage device in practice, and only an upper-layer virtual machine considers that the upper-layer virtual machine calls the virtual storage device. In this scenario, it may be considered that a storage virtualization performance requirement is not met, and the apparatus 700 may be also applicable to the scenario after adaptability modification.

In this specific scenario, the apparatus 700 includes a request obtaining module 701 configured to poll, by accessing virtual memory space corresponding to at least one of virtual storage devices, at least one instruction transmit queue of the at least one virtual storage device in order to obtain multiple read/write requests from the at least one instruction transmit queue, where the virtual memory space is simulated by the host in an MMIO manner, the read/write requests are from an application that runs on the virtual machine, and the read/write requests include information about a target physical storage device, and a request forwarding module 703 configured to perform a first forwarding operation on each of the multiple read/write requests, where the first forwarding operation includes adding, by the host, the read/write request to an instruction transmit queue of the target physical storage device according to the information about the target physical storage device such that the target physical storage device obtains the read/write request from the instruction transmit queue, and performs a read/write operation according to the read/write request.

Optionally, the apparatus 700 further includes a response obtaining module 705 configured to poll at least one instruction response queue of the at least one physical storage device in order to obtain multiple read/write responses from the at least one instruction response queue, where an interrupt of the at least one instruction response queue is a disabled state or a processor of the physical machine is configured for ignoring an interrupt request of the at least one instruction response queue, the read/write responses indicate that a target physical storage device has performed a read/write operation, and the read/write responses include the information about the target physical storage device and, a response forwarding module 707 configured to perform a second forwarding operation on each of the multiple read/write responses, where the second forwarding operation includes adding, by the host, the read/write response to an instruction response queue of a target virtual storage device according to the information about the target physical storage device such that the application obtains the read/write response.

In this way, the apparatus adds a first read/write response to a first read/write request to an instruction response queue of a target virtual storage device, to form a complete processing process of returning a response according to a request, and also obtains a second read/write response from an instruction response queue of a physical storage device in a polling manner. Based on the foregoing technical solutions, an instruction transmit queue of a virtual storage device is polled, thereby simplifying a process of processing a read/write request by a host, increasing a speed of processing a read/write request by software, and reducing a delay of processing the read/write request by the software.

It should be noted that in the foregoing two scenarios, division of the foregoing modules is only illustrative expression, and no limitation is constituted. For example, the response obtaining module 705 and the request obtaining module 701 may be a same module, and the response forwarding module 707 and the request forwarding module 703 may be a same module.

It should be further noted that the response obtaining module 705 and the response forwarding module 707 may be used independently as a composition part of a read/write response processing apparatus. As shown in FIG. 8, in this way, the apparatus 800 is based on the foregoing technical solutions. An instruction response queue of a physical storage device is polled using a process, thereby simplifying a read/write response processing process, increasing a speed of processing a read/write response by software, and reducing a delay of processing the read/write response by the software. Therefore, an application can receive a delivered read/write response more quickly.

Figure 9:
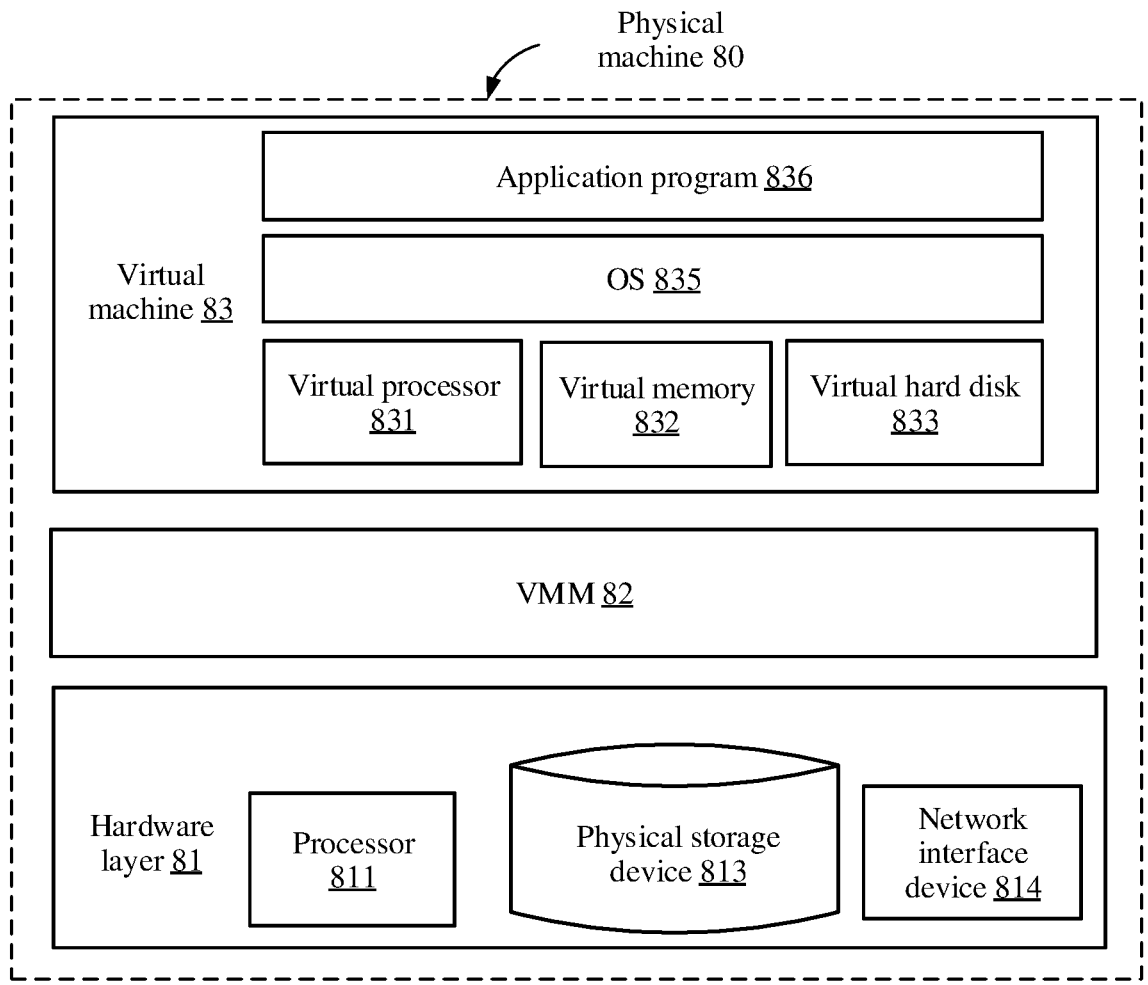
FIG. 9 is a schematic block diagram of a physical machine according to an embodiment of the present disclosure.

FIG. 9 is a schematic diagram of a physical machine 80. The physical machine 80 includes a hardware layer 81, a host machine (not shown), and a virtual machine 83. The hardware layer 81 includes a physical storage device 813, and the hardware layer 81 may further include a processor 811. There may be at least one physical storage device 813. The at least one physical storage device 813 is connected to the processor 811 using a bus system. The at least one physical storage device 813 may include a read-only memory (ROM) and a random access memory (RAM), and provides an instruction and data for the processor 811. The at least one physical storage device 813 includes at least one of a volatile storage medium or a non-volatile storage medium. In some implementations, the at least one physical storage device 813 stores the following element, an executable module or a data structure, or a subset thereof, or an extension set thereof. The hardware layer 81 may further include a network interface device 814 such that the physical machine communicates with another device.

The physical storage device 813 is configured to virtualize a virtual storage device (such as a virtual memory 832 and a virtual hard disk 833 illustrated in the figure) for using by the virtual machine 83. One virtual machine 83 corresponds to at least one virtual storage device, and the virtual storage device is configured to provide a read/write service to the virtual machine. One virtual storage device includes at least one virtual block device.

The host machine, as a management layer, is configured to complete hardware resource management and allocation, present a virtual hardware platform to the virtual machine, and implement virtual machine scheduling and isolation. The host may be a VMM 82. In addition, the VMM 82 cooperates with one privileged virtual machine sometimes, and the VMM 82 is combined with the privileged virtual machine to form the host. A virtual hardware platform provides various hardware resources for all virtual machines that run on the virtual hardware platform, for example, provides a virtual processor 831, a virtual memory, a virtual disk, or a virtual network interface card. The virtual disk may correspond to one file or one logic block device of the host, and the virtual machine runs on the virtual hardware platform prepared for the virtual machine by the host. One or more virtual machines run on the host.

For the virtual machine 83, one or more virtual computers can be simulated on one physical computer using virtual machine software. The virtual machines operate like a real computer. For a virtual machine, various virtual storage devices simulated by the host are like physical storage devices. An OS 835 and an application program 836 can be installed on the virtual machine 83, and the virtual machine 83 can also access a network resource. For the application program 836 that runs in the virtual machine 83, the virtual machine 83 operates like a real computer.

The physical machine 80 in FIG. 9 may be configured to perform the read/write request processing method described in this embodiment of the present disclosure. In this embodiment of the present disclosure, the host calls an operation instruction (the operation instruction may be stored in an OS) stored by an instruction storage, and performs various method procedures in the embodiment corresponding to FIG. 5. For a specific implementation, descriptions, and technical effects, refer to the foregoing embodiments that include but are not limited to description content corresponding to FIG. 5 and description content of FIG. 1 and FIG. 3. Details are not described herein again. It should be understood that a schematic diagram of the physical machine in FIG. 9 is similar to that of the physical machine in FIG. 1. Only FIG. 1 is relatively simple, and a relationship between a host machine and a VMM, and a front-end storage program in the virtual machine are illustratively drawn. FIG. 3 illustratively shows a read/write request processing process performed by the virtual machine and the host. An architecture shown in FIG. 3 depends on the physical machine 80 in FIG. 9.

The physical machine 80 in FIG. 9 may be configured to perform the read/write response processing method described in this embodiment of the present disclosure. In this embodiment of the present disclosure, the host calls an operation instruction (the operation instruction may be stored in an OS) stored by an instruction storage, and performs various method procedures in the embodiment corresponding to FIG. 6. For a specific implementation, descriptions, and technical effects, refer to the foregoing method embodiments that include but are not limited to description content corresponding to FIG. 6 and description content related to FIG. 1, FIG. 3, and FIG. 5. Details are not described herein again.

The physical machine 80 in FIG. 9 may be configured to perform the read/write response processing method in a specific scenario described in this embodiment of the present disclosure. Reference is made to the foregoing corresponding paragraph, and details are not described herein again.

It should be noted that the host in FIG. 9 may be understood as an implementation of the apparatuses shown in FIG. 7 and FIG. 8, that is, the host is implemented using, by the host, a process that runs in a processor and executing a program or an instruction in a storage (that is, the host is implemented by means of mutual cooperation between the processor and a specific instruction in the storage that is coupled with the processor). Details are note described herein. The present disclosure includes but is not limited to the foregoing implementation. It should be understood that all the solutions implemented according to an idea of the present disclosure fall within the protection scope of the embodiments of the present disclosure.

The foregoing method disclosed in the embodiments of the present disclosure may be applied to the processor 811, or implemented by the processor 811. The processor 811 may be an integrated circuit chip and has a signal processing capability. In an implementation process, the steps in the foregoing method may be completed using an integrated logic circuit of hardware in the processor 811 or an instruction in a form of software. The foregoing processor 811 may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or perform the methods, the steps, and the logical block diagrams disclosed in the embodiments of the present disclosure. The general purpose processor may be a microprocessor, or the processor 811 may also be any conventional processor, or the like. The steps of the methods disclosed in the embodiments of the present disclosure may be directly performed by a hardware decoding processor, or performed by a combination of a hardware module and a software module in a decoding processor. The software module may be located in a mature storage medium in the field, such as a RAM, a flash memory, a ROM, a programmable ROM (PROM), an electrically-erasable PROM (EEPROM), or a register. The storage medium is located in the instruction storage and the at least one physical storage device 813. The processor 811 reads information about the storage medium, and completes the steps of the foregoing method in combination with hardware of the processor 811.

It should be understood that in an implementation, modules in the embodiments corresponding to FIG. 7 and FIG. 8 may be implemented by the processor by performing the program or the instruction in the storage (that is, may be implemented by means of mutual cooperation between the processor and a specific instruction in the storage that is coupled with the processor).

The following clearly describes the technical solutions of the virtualization method and apparatus in the embodiments of the present disclosure with reference to FIG. 10 to FIG. 17 in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to a virtualization scenario. In a virtualization scenario, one physical machine may virtualize at least one virtual machine, and each virtual machine includes at least one virtual disk. Types, capacities, and the like of virtual disks may be different.

Figure 10:
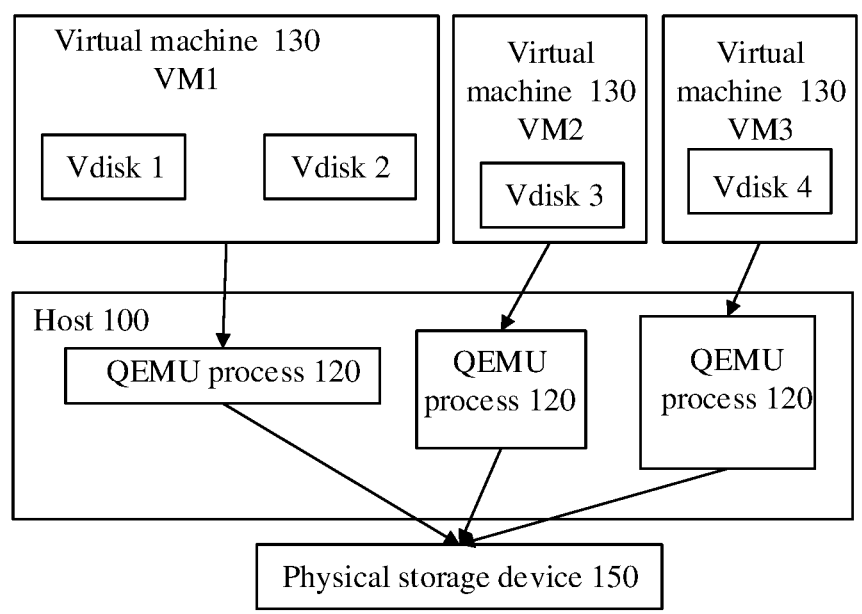
FIG. 10 is a schematic diagram of an application scenario according to an embodiment of the present disclosure.

FIG. 10 shows a schematic diagram of an application scenario of an embodiment of the present disclosure. As shown in FIG. 10, the host 100 may be a desktop. The physical machine 100 may include a virtual machine (designated as VM in the figure) 130 and a QEMU process 120. The virtual machine 130 may include a virtual disk (designated as Vdisk 1, Vdisk 2, Vdisk 3 and Vdisk 4), and the virtual disk may be virtualized by a physical storage device 150.

It should be understood that as shown in FIG. 10, there may be one or more virtual machines 130, QEMU processes 120, and virtual disks. As shown in FIG. 10, the host 100 may include three QEMU processes 120, a virtual machine 130 VM1, a virtual machine 130 VM2, and a virtual machine 130 VM3. The virtual machine 130 VM1 may include a Vdisk 1 and a Vdisk 2, the virtual machine 130 VM2 may include a Vdisk 3, and the virtual machine 130 VM3 may include a Vdisk 4.

Further, the host 100 may include a process that provides an I/O service to the virtual disk, and for example, the process is the QEMU process 120. Generally, one QEMU process 120 corresponds to one virtual machine 130, that is, one QEMU process 120 may provide a service to at least one virtual disk on a virtual machine 130.

Further, the virtual disk may be a virtual NVMe device. The physical storage device 150 may be a physical storage device such as a local SAS disk, an NVMe disk, or a memory in the host 100, or may be a remote high-speed SAN device.

Figure 11:
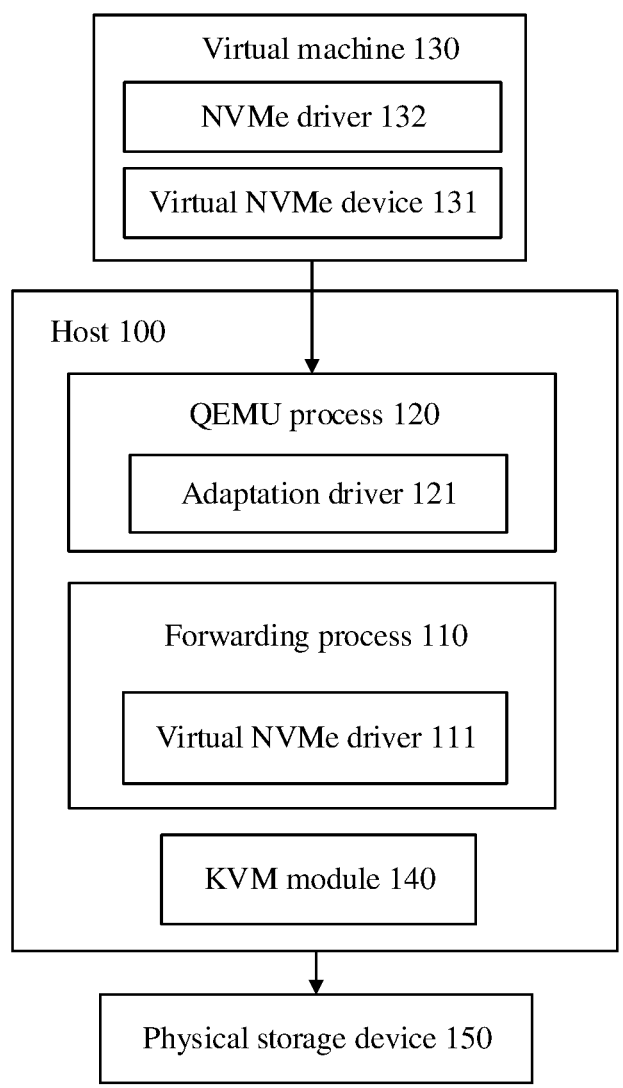
FIG. 11 is a schematic diagram of a system framework according to an embodiment of the present disclosure.

FIG. 11 shows a schematic diagram of a system framework according to an embodiment of the present disclosure. As shown in FIG. 11, the host 100 may further include a forwarding process 110 of a data plane, a QEMU process 120, a virtual machine 130, and a KVM module 140. The forwarding process 110 of the data plane may include a virtual NVMe driver 111. The QEMU process 120 may include an adaptation driver 121. The virtual machine 130 may include a virtual NVMe device 131 and an NVMe driver 132.

Further, the physical storage device 150 may be a physical storage device such as a local SAS disk, an NVMe disk, or a memory in the host 100, or may be a SAN device.

It should be understood that the data plane may be a virtualization storage data plane, or may be a data plane that implements high-performance virtualization of an NVMe device in any polling manner, such as a data plane development kit (DPDK) of the INTEL. This is not limited in the present disclosure.

It should be understood that the virtual NVMe driver 111 may be an NVMe protocol parsing method, for example, may be an NVMe command pre-processing method.

It should be further understood that in this embodiment of the present disclosure, the adaptation driver 121 may have multiple functions. For example, the QEMU process 120 may call the adaptation driver 121 to perform message transmission between the QEMU process 120 and the virtual NVMe driver 111. The QEMU process 120 may call the adaptation driver 121 to parse a name of the virtual NVMe device 131. In addition, the QEMU process 120 may further call the adaptation driver 121 to work with the virtual NVMe driver 111 to complete virtualization of the virtual NVMe device 131.

Figure 12:
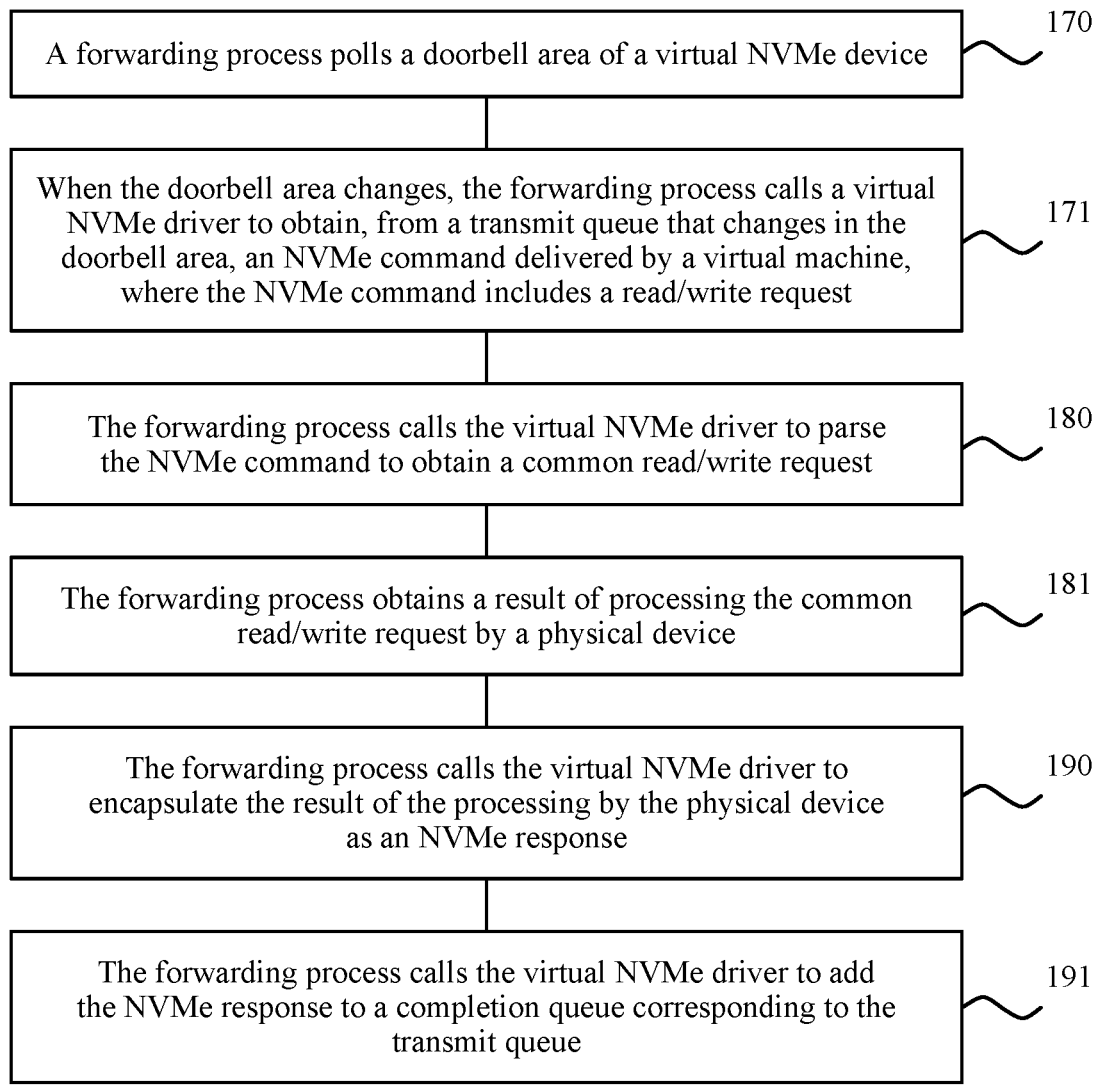
FIG. 12 is a schematic flowchart of a virtualization method according to an embodiment of the present disclosure.

FIG. 12 shows a schematic flowchart of a virtualization method. The method may be performed by a physical machine, and the host may include a virtual machine and a forwarding process of a data plane. The forwarding process of the data plane may include a virtual NVMe driver, and the virtual machine may include a virtual NVMe device. As shown in FIG. 12, the method includes the following steps.

Step 170. The forwarding process polls a doorbell area of the virtual NVMe device.

Step 171. When the doorbell area changes, the forwarding process calls the virtual NVMe driver to obtain, from a changed transmit queue in the doorbell area, an NVMe command delivered by the virtual machine, where the NVMe command includes a read/write request.

Further, before step 170 and step 171, an application program in the virtual machine may further deliver a read/write operation to an NVMe driver in the virtual machine, and the virtual NVMe device may select a transmit queue, and put the NVMe command in a tail of the transmit queue. In addition, the NVMe driver in the virtual machine may increase a tail value of the transmit queue by 1, and may write a tail value in a bit that is in the doorbell area and corresponds to the transmit queue. When polling the doorbell area of the virtual NVMe device, the forwarding process may obtain the NVMe command from the transmit queue.

Step 180. The forwarding process calls the virtual NVMe driver to parse the NVMe command to obtain a common read/write request.

Step 181. The forwarding process obtains a result of processing the common read/write request by a physical storage device.

In step 181, the forwarding process may call the virtual NVMe driver, and submit a read/write request to the physical storage device after processing such as address mapping. After completing processing, the physical storage device transmits a response to the forwarding process.

Step 190. The forwarding process calls the virtual NVMe driver to encapsulate the processing result of the physical storage device as an NVMe response.

In step 190, the forwarding process may call the virtual NVMe driver to encapsulate the processing result of the physical storage device as the NVMe response. In addition, the forwarding process may further increase a tail quantity of a completion queue.

Step 191. The forwarding process calls the virtual NVMe driver to add the NVMe response to a completion queue corresponding to the transmit queue.

Therefore, according to the virtualization method in this embodiment of the present disclosure, an independent forwarding process completes a read/write operation of a virtual NVMe device, and the forwarding process replaces an original timer manner with a polling manner such that QEMU lock contention can be avoided, and a long delay problem can be resolved, thereby implementing high-performance and low-delay NVMe virtualization, and increasing a speed at which an application program in a virtual machine accesses the virtual NVMe device.

Optionally, the host may further include a KVM module. After the forwarding process calls the virtual NVMe driver to add the NVMe response to the completion queue corresponding to the transmit queue, the method further includes the following steps.

Step 192. The forwarding process calls the virtual NVMe driver to send an interrupt request to a KVM module using eventfd.

Step 193. The KVM module injects an interrupt to the virtual machine according to the interrupt request.

Step 194. The virtual machine obtains the NVMe response from the completion queue.

The foregoing content describes a working procedure of a virtual NVMe device. In a virtualization process, an independent forwarding process completes a read/write operation of the virtual NVMe device, and the forwarding process replaces an original timer manner with a polling manner, and establishes a connection from a completion queue to a virtual machine interrupt using eventfd in order to implement high-performance and low-delay NVMe virtualization.

Optionally, before the virtual NVMe device enters a working state, the physical machine may further perform preparation, for example, may create the virtualization NVMe device, the transmit queue, the completion queue, or the interrupt.

Further, after the preparation is completed, the application program in the virtual machine may deliver a read/write request to the created virtual NVMe device, and the read/write request may be placed in the created transmit queue. The forwarding process may call the virtual NVMe device to perform pre-processing and pre-parsing on the read/write request, and place a processing result in the created completion queue.

Figure 13:
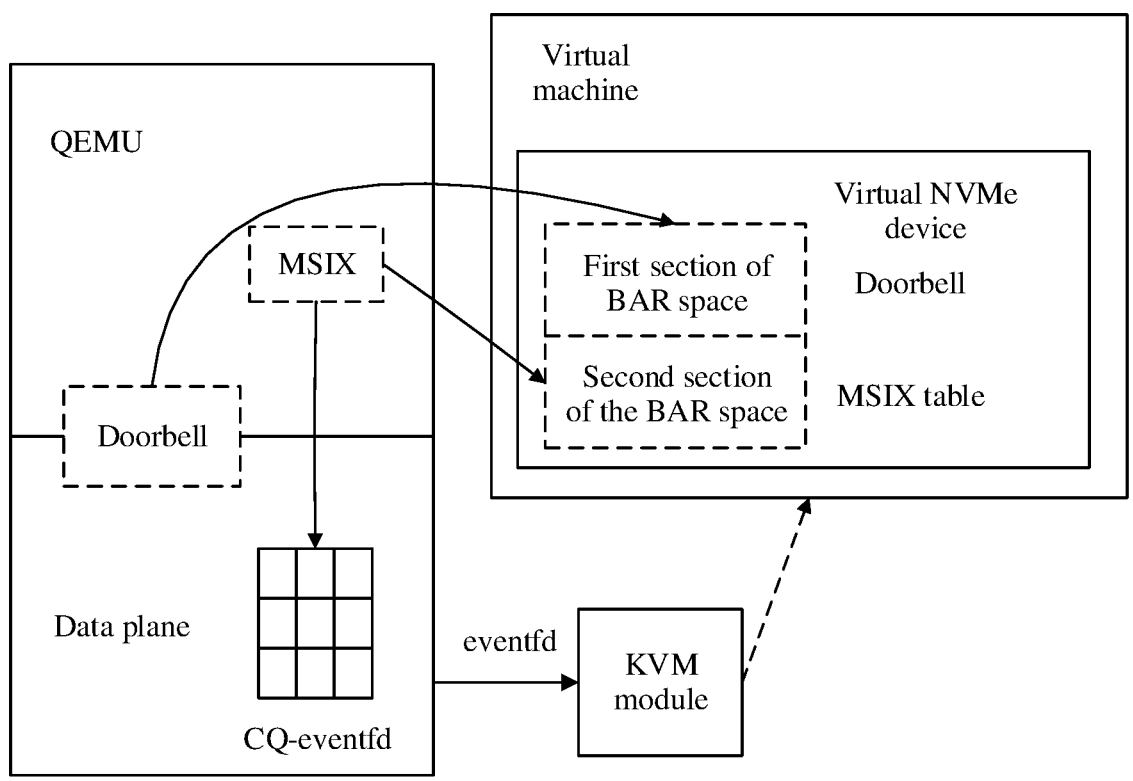
FIG. 13 is a virtualization flowchart of a virtual NVMe device according to an embodiment of the present disclosure.

It can be learned that, as shown in FIG. 13, the physical machine may perform virtualization processing on the virtual NVMe device before the virtual NVMe device enters the working state.

FIG. 13 shows a flowchart of virtualization of a virtual NVMe device. As shown in FIG. 13, the host may include a QEMU process. The QEMU process may share a section of memory space with a forwarding process of a data plane. The shared memory space may be a doorbell area, and the QEMU process may map the shared memory space to a first section of BAR space of a virtual NVMe device in a virtual machine. In addition, the QEMU process may map MSIX table space to a second section of the BAR space of the virtual NVMe device.

The QEMU process may transmit an interrupt number and eventfd that are in the MSIX table space to a data plane using an ioctl function. The data plane may connect a completion queue and the eventfd according to the interrupt number and the eventfd, and may create a table from the completion queue (also referred to as CQ) to the eventfd.

The KVM module may be connected to the data plane using the eventfd such that the forwarding process calls the virtual NVMe driver to send an interrupt request to the KVM module using the eventfd, or the KVM module may establish a connection to the virtual machine such that the KVM module injects an interrupt to the virtual machine according to the interrupt request.

It should be understood that the shared memory space may further include a first CAP area and a second CAP area. The first CAP area may be used to store namespace information, and the second CAP area may include a transmit queue.

Figure 14:
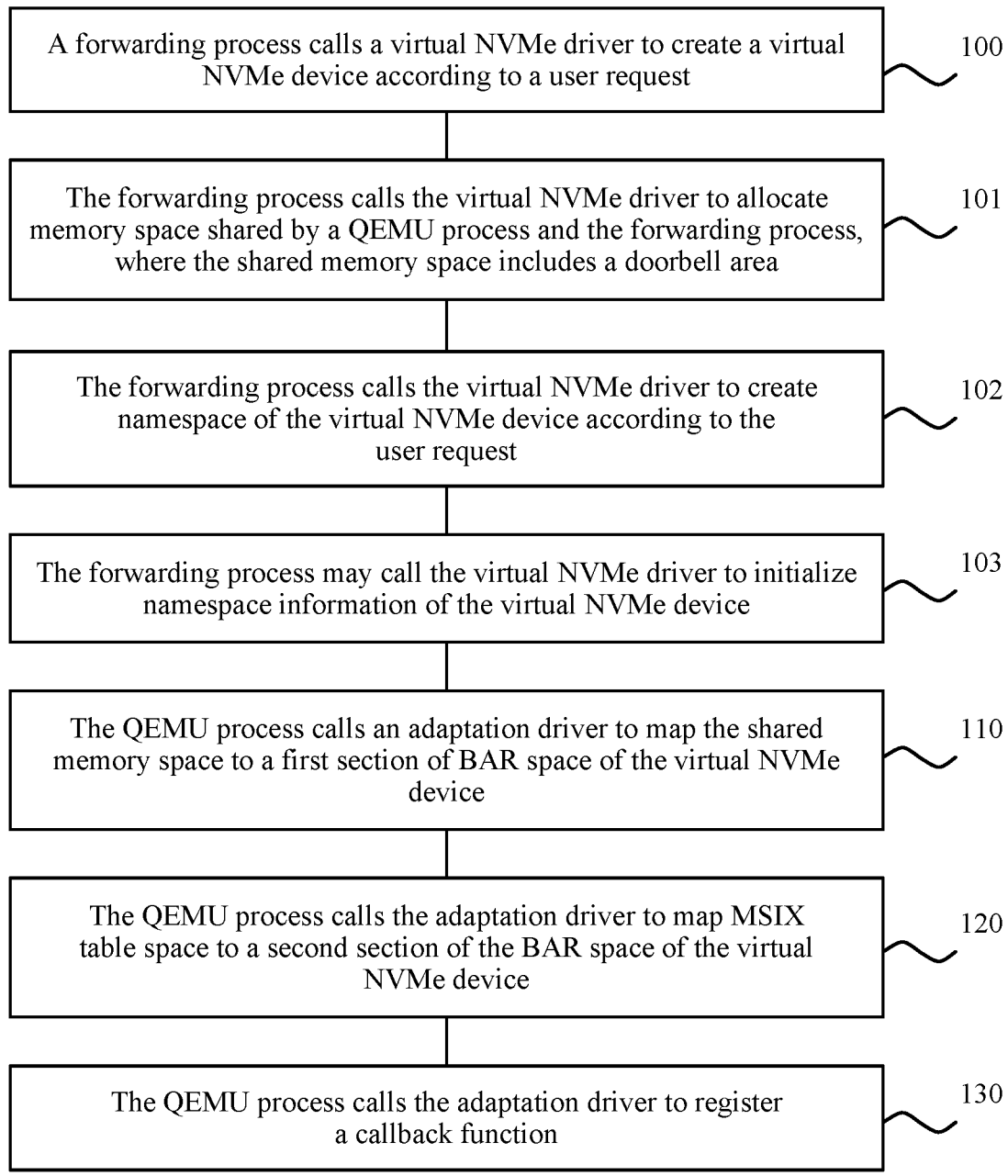
FIG. 14 is another schematic flowchart of a virtualization method according to an embodiment of the present disclosure.
Figure 16:
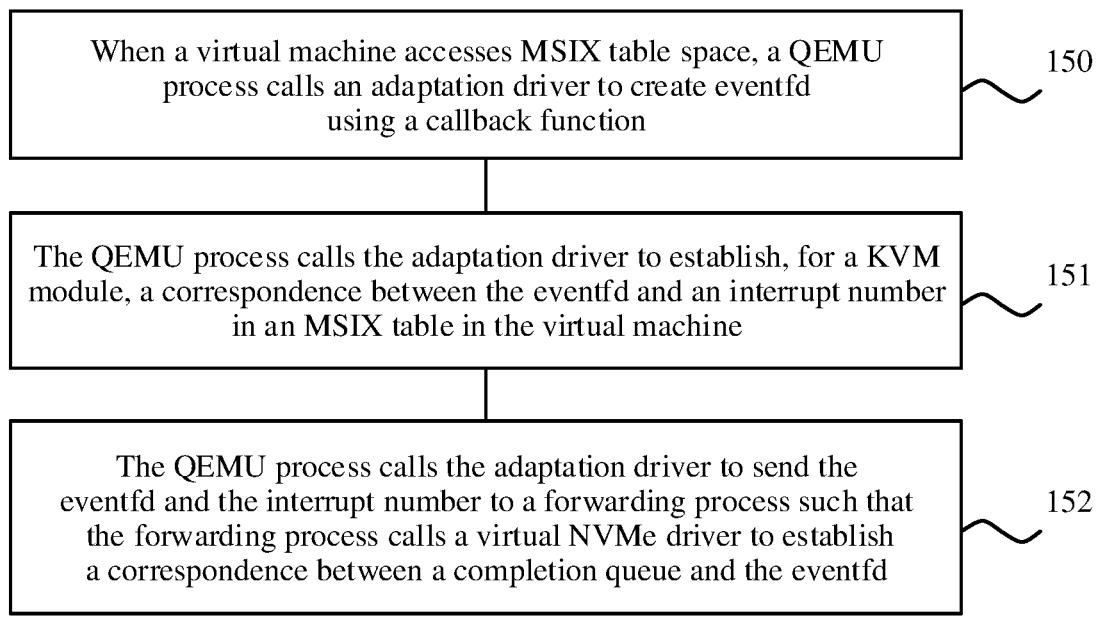
FIG. 16 is still another schematic flowchart of a virtualization method according to an embodiment of the present disclosure.

All steps in FIG. 13 are described in detail in FIG. 14 and FIG. 16. FIG. 14 shows a schematic flowchart of a virtualization method. The method may be performed by a physical machine host. The physical machine host may include a QEMU process, and the QEMU process may include an adaptation driver. As shown in FIG. 14, the method includes the following steps.

Step 100. A forwarding process calls a virtual NVMe driver to create a virtual NVMe device according to a user request.

Step 101. The forwarding process calls the virtual NVMe driver to allocate memory space shared by a QEMU process and the forwarding process, where the shared memory space includes a doorbell area.

In step 100 and step 101, a user may request a data plane to create the virtual NVMe device, and the forwarding process of the data plane may call the virtual NVMe driver to complete the establishment operation. Further, the forwarding process may call the virtual NVMe driver, initialize BAR space of the virtual NVMe device, and apply the shared memory space from the physical machine host. The shared memory space may include the doorbell area.

It should be understood that the shared memory space may be shared by the QEMU process and the forwarding process of the data plane. The shared memory space may be shown in the doorbell area of a dashed line box in FIG. 13, and can be allocated by the data plane such that the forwarding process of the data plane can directly access a section of memory when polling the doorbell area.

Step 110. The QEMU process calls the adaptation driver to map the shared memory space to a first section of BAR space of the virtual NVMe device.

In step 110, the QEMU process may call the adaptation driver, and may map, using interfaces of the adaptation driver and the virtual NVMe driver, the shared memory space to the QEMU process in a specific manner. The manner may be a memory mapped manner or another manner. This is not limited in the present disclosure.

Optionally, in step 110, the QEMU process may call the adaptation driver to map the shared memory space that includes the doorbell area to the first section of the BAR space of the virtual NVMe device in an MMIO manner. The first section of the BAR space is shown in FIG. 13. In addition, the QEMU process may call the adaptation driver to configure a VMCS register on the physical machine host in order to prevent enter and exit caused when an application program in a virtual machine accesses the virtual NVMe device.

It can be learned that in this embodiment of the present disclosure, a conventional port I/O manner is replaced with a non-exit MMIO manner. When the virtual machine delivers a read/write request, a virtual storage device can avoid frequent enter and exit in order to implement high-performance forwarding of the read/write request, and improve virtualization performance.

Step 120. The QEMU process calls the adaptation driver to map MSIX table space to a second section of the BAR space of the virtual NVMe device.

In step 120, the QEMU process may call the adaptation driver to map the MSIX table space to the second section of the BAR space of the virtual NVMe device in the PI/O manner, and the second section of the BAR space is shown in FIG. 13.

Step 130. The QEMU process calls the adaptation driver to register a callback function.

Optionally, in step 130, the QEMU process may call the adaptation driver to register the callback function of a PI/O mode.

It should be understood that in this way, a virtualization process of the virtual NVMe device is completed, and the virtual machine may notice a virtual NVMe device. In addition, high-performance data channels between the virtual machine and the virtual NVMe device, the virtual NVMe driver, the data plane, and a physical storage device are created.

It can be learned that the QEMU process calls the adaptation driver, and the forwarding process calls the virtual NVMe driver. The QEMU process and the forwarding process create the virtual NVMe device by means of cooperation such that a subsequent read/write operation has relatively high storage performance.

Optionally, before step 110, the method may further include the following steps.

Step 102. The forwarding process may call the virtual NVMe driver to create namespace of the virtual NVMe device according to a user request.

In step 102, the user may request the data plane to create the namespace of the virtual NVMe device, and may enter a parameter related to establishing the namespace of the virtual NVMe device to the data plane. The parameter may be an address range, an address mapping manner, and the like that are of a physical storage device corresponding to the namespace. The address range of the physical storage device may be, for example, 0 to 10 GB, and the address mapping manner may be, for example, linear mapping. The parameter related to establishing the namespace of the virtual NVMe device is not limited in the present disclosure.

Step 103. The forwarding process may call the virtual NVMe driver to initialize namespace information of the virtual NVMe device.

In step 103, the forwarding process may call the virtual NVMe driver to initialize the namespace information of the virtual NVMe device. The information may be returned by the forwarding process of the data plane to the virtual machine when the virtual machine loads an NVMe driver and delivers an identify management command, and the namespace on the virtual NVMe device can be found inside of the virtual machine.

Optionally, the user may use a name of the created virtual NVMe device as parameter configuration, and configure the parameter configuration for the virtual machine.

Further, when the user starts the virtual machine, the QEMU process is pulled up. The QEMU process calls a parameter parse method of the adaptation driver, and can parse the name of the virtual NVMe device. The QEMU process requests the data plane to start the virtual NVMe device, and creates a management command channel between the QEMU process and the data plane. The management command channel may be, for example, ioctl, or memory mapped.

It can be learned that according to the virtualization method in this embodiment of the present disclosure, a user may create a virtual NVMe device, namespace of the virtual NVMe device, and a name of the virtual NVMe device according to a requirement, thereby enhancing user experience, and improving virtualization method performance.

Therefore, according to the virtualization method in this embodiment of the present disclosure, a virtual NVMe device is created, and a subsequent forwarding process completes a read/write operation of the virtual NVMe device such that QEMU lock contention can be avoided, and a long delay problem can be resolved, thereby implementing high-performance and low-delay NVMe virtualization, and increasing a speed at which an application program in a virtual machine accesses the virtual NVMe device.

Figure 15:
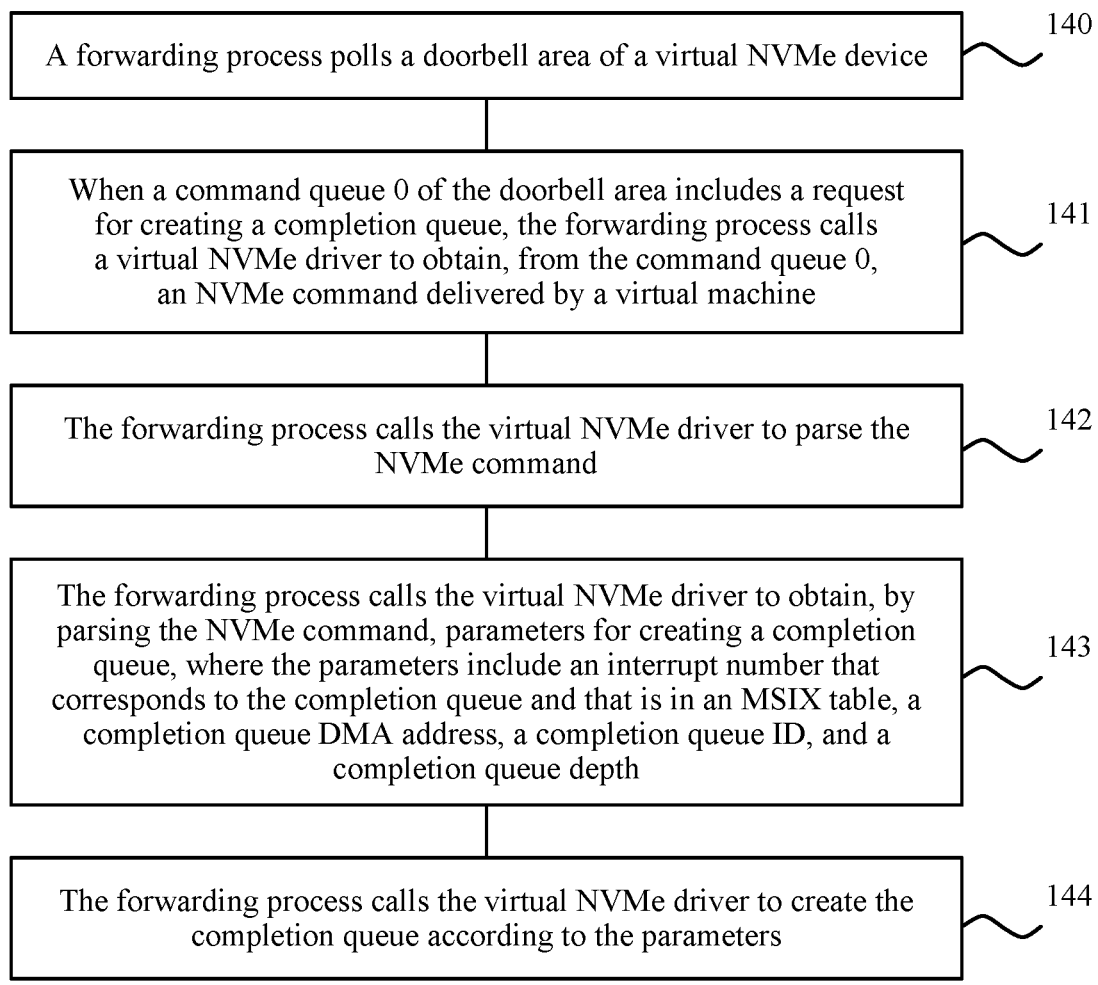
FIG. 15 is still another schematic flowchart of a virtualization method according to an embodiment of the present disclosure.
Figure 17:
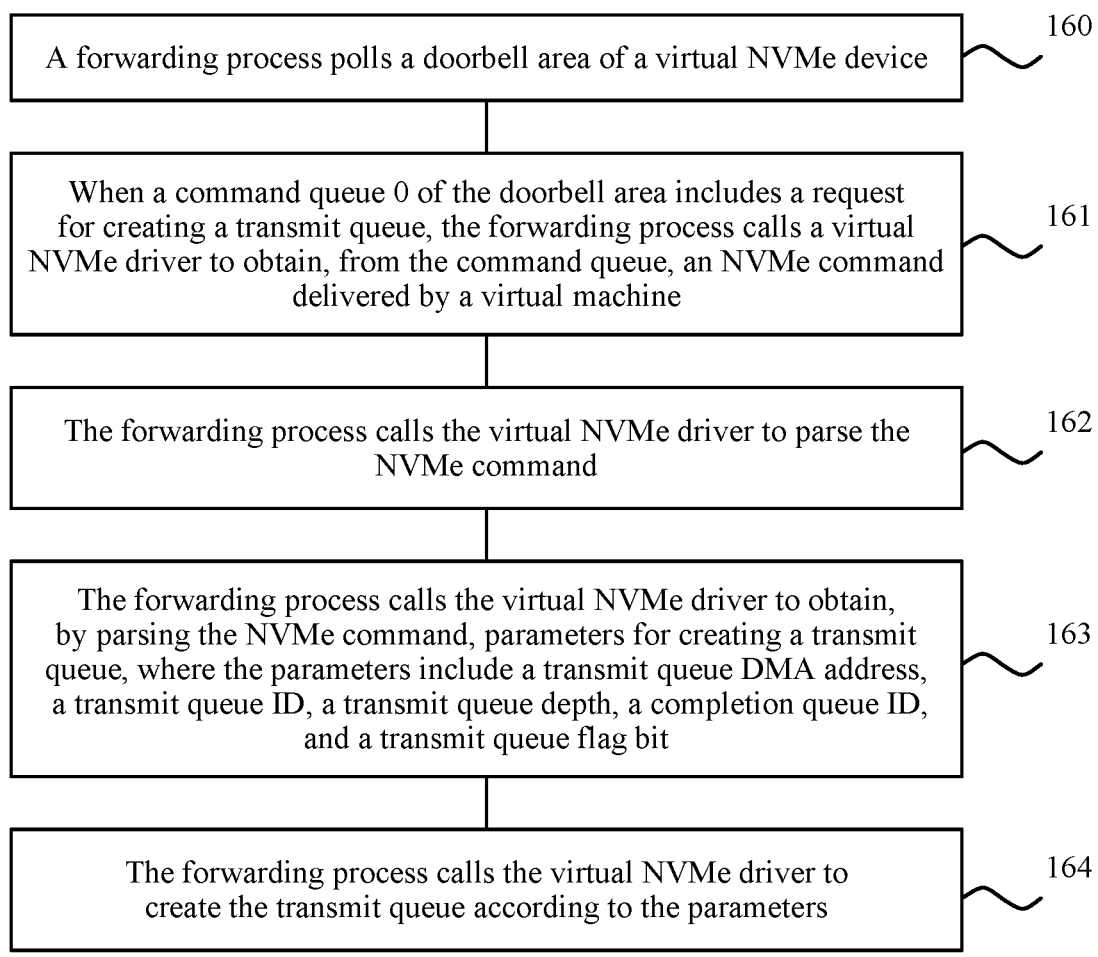
FIG. 17 is still another schematic flowchart of a virtualization method according to an embodiment of the present disclosure.

The foregoing describes in detail the virtualization process of the virtual NVMe device with reference to FIG. 14. With reference to FIG. 15 to FIG. 17, the following describes in detail a process of creating a completion queue, a connection from a completion queue to an interrupt, and a transmit queue in the virtualization method according to the embodiment of the present disclosure.

Optionally, as shown in FIG. 15, in this embodiment of the present disclosure, after the QEMU process calls the adaptation driver to register the callback function, the method further includes the following steps.

Step 140. The forwarding process polls the doorbell area of the virtual NVMe device.

Step 141. When a command queue 0 of the doorbell area includes a request for creating a completion queue, the forwarding process calls the virtual NVMe driver to obtain, from the command queue 0, the NVMe command delivered by the virtual machine.

Further, the forwarding process may poll the doorbell area of the virtual NVMe device. When the virtual machine delivers an operation command for creating the completion queue, the forwarding process may obtain the command for processing.

In step 140 and step 141, when an NVMe driver of the virtual machine loads, a request for creating a corresponding quantity of completion queues can be delivered according to a CPU quantity in the virtual machine. The forwarding process may poll the doorbell area of the virtual NVMe device. When the command queue 0 of the doorbell area includes the request for creating a completion queue, the forwarding process may call the virtual NVMe driver to obtain, from the command queue 0, the NVMe command delivered by the virtual machine.

Step 142. The forwarding process calls the virtual NVMe driver to parse the NVMe command.

Step 143. The forwarding process calls the virtual NVMe driver to obtain, by parsing the NVMe command, parameters for creating a completion queue, where the parameters include an interrupt number that corresponds to the completion queue and that is in an MSIX table, a completion queue DMA address, a completion queue ID, and a completion queue depth.

Optionally, in step 143, the forwarding process may call the virtual NVMe driver to check at least one of the obtained parameters for creating a completion queue.

Further, the forwarding process may call the virtual NVMe driver, check whether the completion queue depth exceeds a maximum depth supported by the virtual NVMe device, check whether a corresponding completion queue exists, check whether the completion queue DMA address is correct, and check whether the interrupt number corresponding to the completion queue is correct.

Step 144. The forwarding process calls the virtual NVMe driver to create the completion queue according to the parameters.

In step 144, the forwarding process may call the virtual NVMe driver to create the completion queue according to the parameters. In addition, the forwarding process may also call the virtual NVMe driver to add the completion queue to a completion queue linked list of the virtual NVMe device. In this way, a newly created completion queue can receive a response.

It should be understood that in a use process of the virtual machine, an operation command for creating or deleting a completion queue may be delivered.

The foregoing content describes a specific process in which a forwarding process calls a virtual NVMe driver to create a completion queue. With reference to FIG. 16, the following describes in detail a specific process in which a forwarding process calls a virtual NVMe driver and a QEMU process calls an adaptation driver, and the forwarding process and the QEMU process jointly establish a connection from a completion queue to an interrupt.

Optionally, as shown in FIG. 16, in this embodiment of the present disclosure, after the completion queue is created, the method further includes the following steps.

Step 150. When the virtual machine accesses the MSIX table space, the QEMU process calls the adaptation driver to create the eventfd using a callback function.

Further, in step 150, when the virtual machine writes an MSIX message into the MSIX table space, QEMU may call the callback function by calling the adaptation driver, and the QEMU process creates the eventfd in the callback function.

Optionally, the QEMU creates the eventfd by calling the adaptation driver and by means of PI/O.

Step 151. The QEMU process calls the adaptation driver to establish, for a KVM module, a correspondence between the eventfd and the interrupt number in the MSIX table in the virtual machine.

In step 151, the QEMU process may call the adaptation driver, associate the eventfd with the interrupt number in the virtual machine, that is, call an interface of the KVM module using the eventfd and the interrupt number in the MSIX message as an input argument, and establish, for the KVM module, an association from the eventfd to a virtual machine interrupt. Further, the association is shown by a dotted line arrow from the KVM module to the virtual machine in FIG. 13 such that the KVM module injects an interrupt to the virtual machine according to the interrupt request.

Step 152. The QEMU process calls the adaptation driver to send the eventfd and the interrupt number to the forwarding process such that the forwarding process calls the virtual NVMe driver to establish a correspondence between the completion queue and the eventfd.

In step 152, the QEMU may call a PI/O callback function by calling the adaptation driver. In the PI/O callback function, the QEMU may send the eventfd and the interrupt number in the corresponding MSIX table to the forwarding process using interfaces of a virtual driver and the adaptation driver such that the forwarding process calls the virtual NVMe driver, establishes the correspondence between a completion queue and eventfd. The correspondence may be a corresponding table between a completion queue and an interrupt number. Further, the eventfd may be shown in FIG. 13. A data plane may be connected to the KVM module using the eventfd such that the forwarding process calls the virtual NVMe driver to send an interrupt request to the KVM module using the eventfd. In addition, the corresponding table may be a CQ-eventfd table in FIG. 13.

It should be further understood that one interrupt number may correspond to one eventfd, and one eventfd may correspond to one completion queue. Therefore, the QEMU process may call the adaptation driver, and can connect the eventfd and an interrupt in the virtual machine by establishing, for the KVM module, the correspondence between the eventfd and the interrupt number in the MSIX table in the virtual machine. In addition, the QEMU process may call the adaptation driver, and can connect the eventfd and the completion queue in the forwarding process by sending the eventfd and the interrupt number to the forwarding process.

In this way, a connection between the interrupt of the virtual machine and a completion queue in a physical machine is created. In a working state of the virtual machine, the KVM module may inject an interrupt to the virtual machine, and the virtual machine may obtain a response from the completion queue according to the interrupt number.

Optionally, when the virtual machine intercepts an unmask change or a mask change of the MSIX table, the QEMU may call the PI/O callback function, call the adaptation driver, and send the eventfd and mask, or the eventfd and unmask to the forwarding process.

Optionally, the QEMU may call the adaptation driver to configure, according to the mask or the unmask, an ID indicating whether the virtual NVMe device is pending such that the forwarding process decides, according to the ID, whether to enable the eventfd for the KVM module.

Further, when the virtual machine intercepts the unmask change of the MSIX table, the forwarding process may call the virtual NVMe driver, configure a corresponding interrupt item status in an interrupt status table, that is, an ID of not pending, and notify the QEMU process. The QEMU process may apply, by querying the MSIX table, an eventfd link corresponding to MSIX, and configure the eventfd link to the forwarding process using ioctl.

It should be understood that the interrupt status table may include the correspondence between a completion queue and eventfd, that is, the CQ-eventfd table and the ID indicating whether the virtual NVMe device is pending. The interrupt status table may be shared by the QEMU process and the data plane, and the data plane allocates storage space.

In a working state, the forwarding process may call the virtual NVMe driver, and send the interrupt request to the KVM module using the eventfd. The KVM module may inject an interrupt to a corresponding CPU in the virtual machine.

When the virtual machine intercepts the mask change of the MSIX table, the forwarding process may call the virtual NVMe driver, configure the corresponding interrupt item status in the interrupt status table, that is, the ID of pending state, and notify the QEMU process.

In a working state, the QEMU process may send an interrupt request to the KVM module using the ioctl, and the KVM module may inject an interrupt to a CPU 0 in the virtual machine.

Optionally, as shown in FIG. 17, in this embodiment of the present disclosure, after the completion queue is created and the connection between the completion queue and the interrupt is created, the method further includes the following steps.

Step 160. The forwarding process polls the doorbell area of the virtual NVMe device.

Step 161. When the command queue 0 of the doorbell area includes a request for creating a transmit queue, the forwarding process calls a virtual NVMe driver to obtain, from the command queue, the NVMe command delivered by the virtual machine.

In step 160 and step 161, when an NVMe driver of the virtual machine loads, a request for creating a corresponding quantity of transmit queues can be delivered according to a quantity of CPUs in the virtual machine. The forwarding process may poll the doorbell area of the virtual NVMe device. When the command queue 0 of the doorbell area includes the request for creating a transmit queue, the forwarding process may call the virtual NVMe driver to obtain, from the command queue 0, the NVMe command delivered by the virtual machine.

Step 162. The forwarding process calls the virtual NVMe driver to parse the NVMe command.

Step 163. The forwarding process calls the virtual NVMe driver to obtain, by parsing the NVMe command, parameters for creating a transmit queue, where the parameters include a transmit queue DMA address, a transmit queue ID, a transmit queue depth, a completion queue ID, and a transmit queue flag bit.

Optionally, in step 163, the forwarding process may call the virtual NVMe driver to check at least one of the obtained parameters for creating a transmit queue.

Further, the forwarding process may call the virtual NVMe driver, may check whether the transmit queue depth exceeds a maximum depth supported by the virtual NVMe device, may check whether a corresponding transmit queue exists, may check whether the transmit queue DMA address is correct, and may check whether the transmit queue flag bit is correct, may check whether the completion queue ID is correct.

Step 164. The forwarding process calls the virtual NVMe driver to create the transmit queue according to the parameters.

In step 164, the forwarding process may call the virtual NVMe driver to create the transmit queue according to the parameters. In addition, the forwarding process may further call the virtual NVMe driver to add the transmit queue to a transmit queue link table of the virtual NVMe device. In this way, a newly created transmit queue may be stored in a read/write request in the virtual machine.

In a working state, the forwarding process may traverse the doorbell area of the virtual NVMe device. The doorbell area includes a quantity of valid requests of at least one transmit queue. Once the forwarding process finds that a valid request in a transmit queue needs to be processed, the forwarding process may call a virtual NVMe driver to process a request, and a manner of delaying a trigger using a timer is not used.

It should be understood that in a use process of the virtual machine, a transmit queue may be created or deleted.

Therefore, according to the virtualization method in this embodiment of the present disclosure, a virtual NVMe device, a completion queue, a connection from the completion queue to an interrupt, and a transmit queue are created, and a subsequent forwarding process completes a read/write operation of the virtual NVMe device such that QEMU lock contention can be avoided, and a long delay problem can be resolved, thereby implementing high-performance and low-delay NVMe virtualization, and increasing a speed at which an application program in a virtual machine accesses the virtual NVMe device.

The foregoing describes in detail the virtualization methods according to the embodiments of the present disclosure with reference to FIG. 10 to FIG. 17, and the following describes a virtualization apparatus according to an embodiment of the present disclosure.

The virtualization apparatus in this embodiment of the present disclosure may be a physical machine host 100. The physical machine host 100 includes a virtual machine 130 and a forwarding process 110 of a data plane. The forwarding process 110 of the data plane includes a virtual NVMe driver 111, and the virtual machine 130 includes a virtual NVMe device 131.

The forwarding process 110 is configured to poll a doorbell area of the virtual NVMe device 131, when the doorbell area changes, call the virtual NVMe driver 111 to obtain, from a transmit queue that changes in the doorbell area, an NVMe command delivered by the virtual machine 130, where the NVMe command includes a read/write request, call the virtual NVMe driver 111 to parse the NVMe command to obtain a common read/write request, obtain a result of processing the common read/write request by a physical storage device 150, call the virtual NVMe driver 111 to encapsulate the processing result of the physical storage device 150 to an NVMe response, and call the virtual NVMe driver 111 to add the NVMe response to a completion queue corresponding to the transmit queue.

Therefore, according to the virtualization method in this embodiment of the present disclosure, an independent forwarding process completes a read/write operation of a virtual NVMe device, and the forwarding process replaces an original timer manner with a polling manner such that QEMU lock contention can be avoided, and a long delay problem can be resolved, thereby implementing high-performance and low-delay NVMe virtualization, and increasing a speed at which an application program in a virtual machine accesses the virtual NVMe device.

Optionally, the physical machine host 100 further includes a KVM module 140. The forwarding process 110 is further configured to, after the forwarding process 110 calls the virtual NVMe driver 111 to add the NVMe response to the completion queue corresponding to the transmit queue, call the virtual NVMe driver 111 to send an interrupt request to the KVM module 140 using eventfd.

The KVM module 140 is configured to inject an interrupt to the virtual machine 130 according to the interrupt request.

The virtual machine 130 is configured to obtain the NVMe response from the completion queue.

It should be understood that the virtualization apparatus according to this embodiment of the present disclosure may be corresponding to the method in the embodiment of the present disclosure. In addition, the foregoing and other operations and/or functions of the apparatus are separately used to implement a corresponding procedure of the method in FIG. 12. For brevity, details are not described herein again.

Optionally, as shown in FIG. 11, in the physical machine host 100, the physical machine host 100 may include a QEMU process 120, and the QEMU process 120 includes an adaptation driver 121. The forwarding process 110 is further configured to, before the forwarding process 110 polls the doorbell area of the virtual NVMe device 131, call the virtual NVMe driver 111 to create the virtual NVMe device 131 according to a user request, and call the virtual NVMe driver 111 to allocate memory space shared by a QEMU process and the forwarding process, where the shared memory space includes the doorbell area.

The QEMU process 120 is further configured to call the adaptation driver 121 to map the shared memory space to a first section of BAR space of the virtual NVMe device 131, call the adaptation driver 121 to map MSIX table space to a second section of the BAR space of the virtual NVMe device 131, and call the adaptation driver 121 to register a callback function.

It should be understood that the virtualization apparatus according to this embodiment of the present disclosure may be corresponding to the method in the embodiment of the present disclosure. In addition, the foregoing and other operations and/or functions of the apparatus are separately used to implement a corresponding procedure of the method in FIG. 14. For brevity, details are not described herein again.

The physical machine 80 in FIG. 9 may also perform the method shown in FIG. 14, and for description of same or corresponding nouns in the method shown in FIG. 14, refer to description content of the embodiments corresponding to FIG. 1 to FIG. 9. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

Details are note described herein. The present disclosure includes but is not limited to the foregoing implementation. It should be understood that all the solutions implemented according to an idea of the present disclosure fall within the protection scope of the embodiments of the present disclosure.

What is claimed is:

1. A method for processing a read/write request implemented by a physical machine comprising a physical storage device, a host machine (host), and a virtual machine, wherein the method comprises:

accessing, by a host machine (host), a virtual memory space, wherein the virtual memory space corresponds to at least one virtual storage device that provides a storage service to the virtual machine, and wherein the at least one virtual storage device is virtualized by a corresponding physical storage device;

polling, by the host, at least one instruction transmit queue of the at least one virtual storage device after accessing the virtual memory space;

obtaining, by the host, a plurality of read/write requests from the at least one instruction transmit queue in response to the polling, wherein the read/write requests comprise a first read/write request, wherein the virtual memory space is simulated by the host in a memory mapped input/output (I/O) (MMIO) manner, wherein the read/write requests are requests of an application that runs on the virtual machine, and wherein the first read/write request comprises first information about a target virtual storage device; and performing, by the host, a first forwarding operation on the first read/write request, wherein performing the first forwarding operation comprises:

generating, by the host according to the first information about the target virtual storage device and a mapping relationship between the first information about the target virtual storage device and second information about a target physical storage device, a second read/write request that corresponds to the first read/write request, wherein the second read/write request comprises the information about the target physical storage device, and wherein a format of the second read/write request matches the target physical storage device; and adding, by the host, the second read/write request to a second instruction transmit queue of the target physical storage device according to the second information about the target physical storage device so as to enable the target physical storage device to obtain the second read/write request from the second instruction transmit queue of the target physical storage device and to perform a read/write operation according to the second read/write request.

2. The method of claim 1, wherein generating the second read/write request that corresponds to the first read/write request comprises:

generating, by the host, the second read/write request that corresponds to the first read/write request according to the first information about the target virtual storage device and the mapping relationship between the first information about the target virtual storage device and the second information about the target physical storage device, and wherein the second read/write request comprises the second information about the target physical storage device.

3. The method of claim 2, further comprising:

obtaining, by the host, a third read/write request from the at least one instruction transmit queue by polling, wherein the third read/write request comprises a length of read/written data and information about a read/written virtual storage device, wherein the read/written virtual storage device comprises a read/written target virtual block device, and wherein the length of the read/written data is greater than a readable/writable address range of the read/written target virtual block device;

generating, by the host, a first response to the third read/write request; and adding, by the host, the first response to a first instruction response queue of the read/written virtual storage device, wherein the first response to the third read/write request indicates a read/write operation that corresponds to the third read/write request is failed.

4. The method of claim 2, further comprising:

obtaining, by the host, a third read/write request from the at least one instruction transmit queue by polling, wherein the third read/write request comprises a length of read/written data and information about a read/written virtual storage device, wherein the read/written virtual storage device comprises a read/written target virtual block device, and wherein the length of the read/written data is equal to a readable/writable address range of the read/written target virtual block device;

generating, by the host, a first response to the third read/write request; and adding, by the host, the first response to the third read/write request to an instruction response queue of the read/written virtual storage device, wherein the first response indicates a read/write operation that corresponds to the third read/write request has failed.

5. The method of claim 1, further comprising:

polling, by the host, at least one instruction response queue of at least one physical storage device to obtain a plurality of second read/write responses from the at least one instruction response queue, wherein an interrupt of the at least one instruction response queue comprises a disabled state, wherein the second read/write responses indicate the target physical storage device has performed a read/write operation, and wherein the second read/write responses comprise the information about the target physical storage device; and performing, by the host, a second forwarding operation on each of the second read/write responses, wherein the second forwarding operation comprises:

generating, by the host according to the information about the target physical storage device and the mapping relationship between the information about the target physical storage device and the information about the target virtual storage device, a first read/write response corresponding to a second read/write response, wherein the first read/write response comprises the information about the target virtual storage device; and adding, by the host, the first read/write response to an instruction response queue of the target virtual storage device according to the information about the target virtual storage device to enable the application to obtain the first read/write response.

6. The method of claim 5, wherein generating the first read/write response that corresponds to the second read/write response comprises:

determining, by the host, the information about the target virtual storage device according to the information about the target physical storage device and the mapping relationship between the information about the target physical storage device and the information about the target virtual storage device; and generating, by the host, the first read/write response that corresponds to the second read/write response, wherein the first read/write response comprises the information about the target virtual storage device, and wherein a format of the first read/write response matches the target virtual storage device.

7. The method of claim 5, wherein generating the first read/write response that corresponds to the second read/write response comprises:

determining, by the host, the first information about the target virtual storage device according to the second information about the target physical storage device and the mapping relationship between the second information about the target physical storage device and the first information about the target virtual storage device; and generating, by the host, the first read/write response corresponding to the second read/write response, wherein the first read/write response comprises the first information about the target virtual storage device, and wherein a format of the first read/write response matches the target virtual storage device.

8. The method of claim 1, further comprising:

polling, by the host, at least one instruction response queue of at least one physical storage device;

obtaining, by the host, a plurality of read/write responses from the at least one instruction response queue in response to the polling, wherein an interrupt of the at least one instruction response queue comprises a processor of the physical machine that is configured to ignore an interrupt request of the at least one instruction response queue, wherein the read/write responses comprises a second read/write response, wherein the second read/write response indicates that the target physical storage device has performed a read/write operation, and wherein the second read/write response comprises the information about the target physical storage device; and performing, by the host, a second forwarding operation on the second read/write response, wherein performing the second forwarding operation comprises:

generating, by the host according to the second information about the target physical storage device and the mapping relationship between the second information about the target physical storage device and the first information about the target virtual storage device, a first read/write response that corresponds to the second read/write response, wherein the first read/write response comprises the first information about the target virtual storage device; and adding, by the host, the first read/write response to an instruction response queue of the target virtual storage device according to the first information about the target virtual storage device to enable the application to obtain the first read/write response.

9. A physical machine applied for processing a read/write request, comprising:

a physical storage device configured to virtualize a virtual storage device; and a host machine (host) coupled to the physical storage device and configured to:

access a virtual memory space, wherein the virtual memory space corresponds to at least one virtual storage device;

poll, at least one instruction transmit queue of the at least one virtual storage device after accessing the virtual memory space;

obtain a plurality of read/write requests from the at least one instruction transmit queue in response to the polling, wherein the read/write requests comprise a first read/write request, wherein the virtual memory space is simulated by the host in a memory mapped input/output (I/O) (MMIO) manner, wherein the read/write requests are requests of an application that runs on a virtual machine, and wherein the first read/write request comprises first information about a target virtual storage device; and perform a first forwarding operation on the first read/write request, wherein when performing the first forwarding operation, the host is further configured to:

generate, according to the first information about the target virtual storage device and a mapping relationship between the first information about the target virtual storage device and second information about a target physical storage device, a second read/write request that corresponds to the first read/write request, wherein the second read/write request comprises the information about the target physical storage device, and wherein a format of the second read/write request matches the target physical storage device; and add the second read/write request to a second instruction transmit queue of the target physical storage device according to the second information about the target physical storage device so as to enable the target physical storage device to obtain the second read/write request from the second instruction transmit queue of the target physical storage device and to perform a read/write operation according to the second read/write request.

10. The physical machine of claim 9, wherein when generating the second read/write request that corresponds to the first read/write request, the host is further configured to:

determine the second information about the target physical storage device according to the first information about the target virtual storage device and the mapping relationship between the first information about the target virtual storage device and the second information about the target physical storage device; and generate the second read/write request that corresponds to the first read/write request, wherein the second read/write request comprises the second information about the target physical storage device.

11. The physical machine of claim 10, wherein the host is further configured to:

obtain a third read/write request from the at least one instruction transmit queue by polling, wherein the third read/write request comprises a length of read/written data and information about a read/written virtual storage device, wherein the read/written virtual storage device comprises a read/written target virtual block device, and wherein the length of the read/written data is greater than a readable/writable address range of the read/written target virtual block device;

generate a first response to the third read/write request; and add the first response to a first instruction response queue of the read/written virtual storage device, wherein the first response to the third read/write request indicates a read/write operation that corresponds to the third read/write request is failed.

12. The physical machine of claim 10, wherein the host is further configured to:

obtain a third read/write request from the at least one instruction transmit queue by polling, wherein the third read/write request comprises a length of read/written data and information about a read/written virtual storage device, wherein the read/written virtual storage device comprises a read/written target virtual block device, and wherein the length of the read/written data is equal to a readable/writable address range of the read/written target virtual block device;

generate a first response to the third read/write request; and add the first response to the third read/write request to an instruction response queue of the read/written indicates a read/write operation that corresponds to the third read/write request has failed.

13. The physical machine of claim 9, wherein the host is further configured to:

poll at least one instruction response queue of at least one physical storage device to obtain a plurality of second read/write responses from the at least one instruction response queue, wherein an interrupt of the at least one instruction response queue comprises a disabled state, wherein the second read/write responses indicate the target physical storage device has performed a read/write operation, and wherein the second read/write responses comprise the information about the target physical storage device; and perform a second forwarding operation on each of the second read/write responses, wherein when performing the second forwarding operation, the host is further configured to:

generate, according to the information about the target physical storage device and the mapping relationship between the information about the target physical storage device and the information about the target virtual storage device, a first read/write response that corresponds to a second read/write response, wherein the first read/write response comprises the information about the target virtual storage device; and add the first read/write response to an instruction response queue of the target virtual storage device according to the information about the target virtual storage device to enable the application to obtain the first read/write response.

14. The physical machine of claim 13, wherein when generating the first read/write response that corresponds to the second read/write response, the host is further configured to:

determine the information about the target virtual storage device according to the information about the target physical storage device and the mapping relationship between the information about the target physical storage device and the information about the target virtual storage device; and generate the first read/write response corresponding to the second read/write response, wherein the first read/write response comprises the information about the target virtual storage device, and wherein a format of the first read/write response matches the target virtual storage device.

15. The physical machine of claim 13, wherein when generating the first read/write response corresponding to the second read/write response, the host is further configured to:

determine the first information about the target virtual storage device according to the second information about the target physical storage device and the mapping relationship between the second information about the target physical storage device and the first information about the target virtual storage device; and generate the first read/write response that corresponds to the second read/write response, wherein the first read/write response comprises the first information about the target virtual storage device, and wherein a format of the first read/write response matches the target virtual storage device.

16. The physical machine of claim 9, wherein the host is further configured to:

poll at least one instruction response queue of at least one physical storage device obtain a plurality of read/write responses from the at least one instruction response queue in response to the polling, wherein an interrupt of the at least one instruction response queue comprises a processor of the physical machine that is configured for ignoring to ignore an interrupt request of the at least one instruction response queue, wherein the read/write responses comprises a second read/write response, wherein the second read/write response indicates that the target physical storage device has performed a read/write operation, and wherein the second read/write response comprises the information about the target physical storage device; and perform a second forwarding operation on the second read/write response, wherein when performing the second forwarding operation, the host is further configured to:

generate, according to the second information about the target physical storage device and the mapping relationship between the second information about the target physical storage device and the first information about the target virtual storage device, a first read/write response that corresponds to the second read/write response, wherein the first read/write response comprises the first information about the target virtual storage device; and add the first read/write response to an instruction response queue of the target virtual storage device according to the first information about the target virtual storage device to enable the application to obtain the first read/write response.

17. A method for processing a read/write response in a physical machine comprising at least one physical storage device, a host machine (host), and a virtual machine, wherein the method comprises:

polling, by the host, at least one instruction response queue of at least one physical storage device;

obtaining, by the host, a plurality of read/write responses from the at least one instruction response queue in response to the polling, wherein a processor of the physical machine is configured to ignore an interrupt request of the at least one instruction response queue so as to obtain the read-write responses according to the polling, wherein the read/write responses comprises a first read/write response, wherein the first read/write response indicates that a target physical storage device has performed a read/write operation, and wherein the first read/write response comprises first information about the target physical storage device; and performing, by the host, a forwarding operation on the first read/write response, wherein performing the forwarding operation comprises:

generating, by the host according to the first information about the target physical storage device and a mapping relationship between the first information about the target physical storage device and second information about a target virtual storage device, a second read/write response that corresponds to the first read/write response, wherein the second read/write response comprises the second information about the target virtual storage device; and adding, by the host, the second read/write response to a second instruction response queue of the target virtual storage device according to the second information about the target virtual storage device so as to enable an application to obtain the second read/write response.

18. The method of claim 17, wherein generating the second read/write response that corresponds to the first read/write response, the method further comprises:

determining, by the host, the second information about the target virtual storage device according to the first information about the target physical storage device and the mapping relationship between the first information about the target physical storage device and the second information about the target virtual storage device; and generating, by the host, the second read/write response that corresponds to the first read/write response, wherein the second read/write response comprises the second information about the target virtual storage device, and wherein a format of the second read/write response matches the target virtual storage device.

* * * * *

UNITED STATES PATENT AND TRADEMARK OFFICE
CERTIFICATE OF CORRECTION

PATENT NO. : 10,579,305 B2
APPLICATION NO. : 16/025584
DATED : March 3, 2020
INVENTOR(S) : Lina Lu Page 1 of 1

It is certified that error appears in the above-identified patent and that said Letters Patent is hereby corrected as shown below:

On the Title Page

Page 2, item (56), Other Publications, Column 2, Line 9: "Jong, R." should read "Dong, R."

In the Claims

Claim 16, Column 55, Line 50: "storage device" should read "storage device;"

Claim 16, Column 55, Line 55: "configured for ignoring to" should read "configured to"

Signed and Sealed this
Nineteenth Day of May, 2020

Andrei Iancu
*Director of the United States Patent and Trademark Office*